US009945931B2

(12) United States Patent
Allen et al.

(10) Patent No.: US 9,945,931 B2
(45) Date of Patent: Apr. 17, 2018

(54) TECHNIQUES FOR NAVIGATING UAVS USING GROUND-BASED TRANSMITTERS

(71) Applicant: University of Kansas, Lawrence, KS (US)

(72) Inventors: Christopher T. Allen, Lawrence, KS (US); Shawn Shahriar Keshmiri, Lawrence, KS (US); Masud Al Aziz, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 14/966,870

(22) Filed: Dec. 11, 2015

(65) Prior Publication Data

US 2017/0199269 A1  Jul. 13, 2017

Related U.S. Application Data

(60) Provisional application No. 62/091,292, filed on Dec. 12, 2014.

(51) Int. Cl.
| | | |
|---|---|---|
| *G01S 5/10* | (2006.01) | |
| *G01S 5/02* | (2010.01) | |
| *B64C 39/02* | (2006.01) | |

(52) U.S. Cl.
CPC .............. *G01S 5/10* (2013.01); *B64C 39/024* (2013.01); *G01S 5/0242* (2013.01); *G01S 5/0263* (2013.01)

(58) Field of Classification Search
CPC ........ G01S 5/10; G01S 5/0263; G01S 5/0242; B64C 39/024
See application file for complete search history.

(56) References Cited

U.S. PATENT DOCUMENTS

| | | | |
|---|---|---|---|
| 4,308,536 A | 12/1981 | Sims, Jr. et al. | |
| 7,818,127 B1 | 10/2010 | Duggan et al. | |
| 7,830,299 B2 | 11/2010 | Steele et al. | |
| 8,380,425 B2 | 2/2013 | Duggan et al. | |

(Continued)

FOREIGN PATENT DOCUMENTS

| | | |
|---|---|---|
| EP | 1787140 B1 | 9/2012 |
| EP | 2442133 B | 2/2014 |
| WO | WO-2006/021813 A1 | 3/2006 |

OTHER PUBLICATIONS

Edrich, M., "Ultra-Lightweight Synthetic Aperture Radar Based on a 35 GHz FMCW Sensor Concept and Online Raw Data Transmission," IEEE Proceedings—Radar Sonar Navigation, vol. 153, No. 2, Apr. 2008.

(Continued)

*Primary Examiner* — Mussa A Shaawat
*Assistant Examiner* — Michael V Kerrigan
(74) *Attorney, Agent, or Firm* — Norton Rose Fulbright US LLP

(57) ABSTRACT

Systems, methods, apparatuses and computer-readable storage media for navigating an unmanned aerial vehicle (UAV) using signals of opportunity are disclosed. The UAV may include a receiver for detecting a plurality of signals at two or more receiver elements. The UAV may estimate an angle of arrival (AoA) for at least two signals of the plurality of signals, and may estimate a position of the receiver based, at least in part, on the AoA for each of the at least two signals. Known locations of the transmitters that are transmitting the at least two signals may be used in conjunction with the AoAs to determine the estimate of the position of the receiver. More than two signals may be used to localize the estimated position of the receiver.

30 Claims, 26 Drawing Sheets

(56) References Cited

U.S. PATENT DOCUMENTS

| | | |
|---|---|---|
| 8,633,851 B2 | 1/2014 | Vacanti et al. |
| 2011/0169943 A1 | 7/2011 | Bachman, II et al. |
| 2012/0068877 A1 | 3/2012 | Stayton |
| 2012/0194389 A1* | 8/2012 | Faragher .................. G01S 5/02 342/463 |
| 2012/0201195 A1* | 8/2012 | Rausch .................. G01S 5/021 370/328 |
| 2013/0234880 A1 | 9/2013 | Lee et al. |
| 2014/0062755 A1 | 3/2014 | Kabrt et al. |
| 2014/0062792 A1* | 3/2014 | Schantz ................ G01S 5/0252 342/451 |
| 2014/0139366 A1 | 5/2014 | Moses et al. |
| 2016/0077196 A1* | 3/2016 | Dehlink ............. G01R 31/2822 342/169 |

OTHER PUBLICATIONS

Gu, C. et al., "Instrument-Based Noncontact Doppler Radar Vital Sign Detection System Using Heterodyne Digital Quadrature Demodulation Architecture," IEEE Transactions on Instrumentation and Measurement, vol. 59, No, 6, Jun. 2010.

Stastny, T.J. et al., "Collision and Obstacle Avoidance in Unmanned Aerial Systems Using Morphing Potential Field Navigation and Nonlinear Model Predictive Control," J. Dyn. Sys., Meas., Control, vol. 137, No. 1, Aug. 28, 2014, 10 pp., ASME.

Viquerat, A. et al., "Reactive Collision Avoidance for Unmanned Aerial Vehicles Using Doppler Radar," 6th International Conference on Field and Service Robotics—FSR 2007, Chamonix, France 2007.

Shi, L. et al., "Multichannel Sense-And-Avoid Radar for Small UAVS," 32nd Digital Avionics Systems Conference, Oct. 6-10, 2013, 10 pp.

Shi. L. et al., "Multichannel Sense-and-Avoid Radar for Small UAVs," Abstract submitted with registration for University of Kansas Center for Technology Commercialization (KUCTC) Innovation Fair, Apr. 19, 2013, 1 page.

Shi, L., Poster submitted during University of Kansas Center for Technology Commercialization (KUCTC) Innovation Fair, Apr. 30, 2013, 1 page.

* cited by examiner

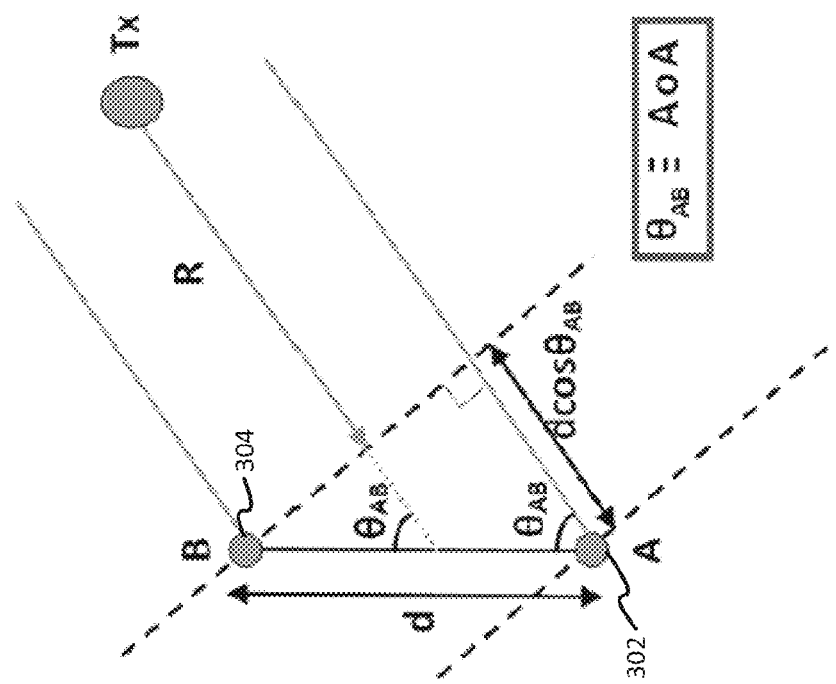
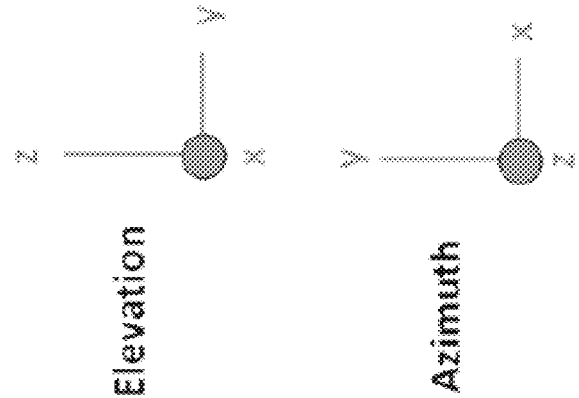
FIG. 5A

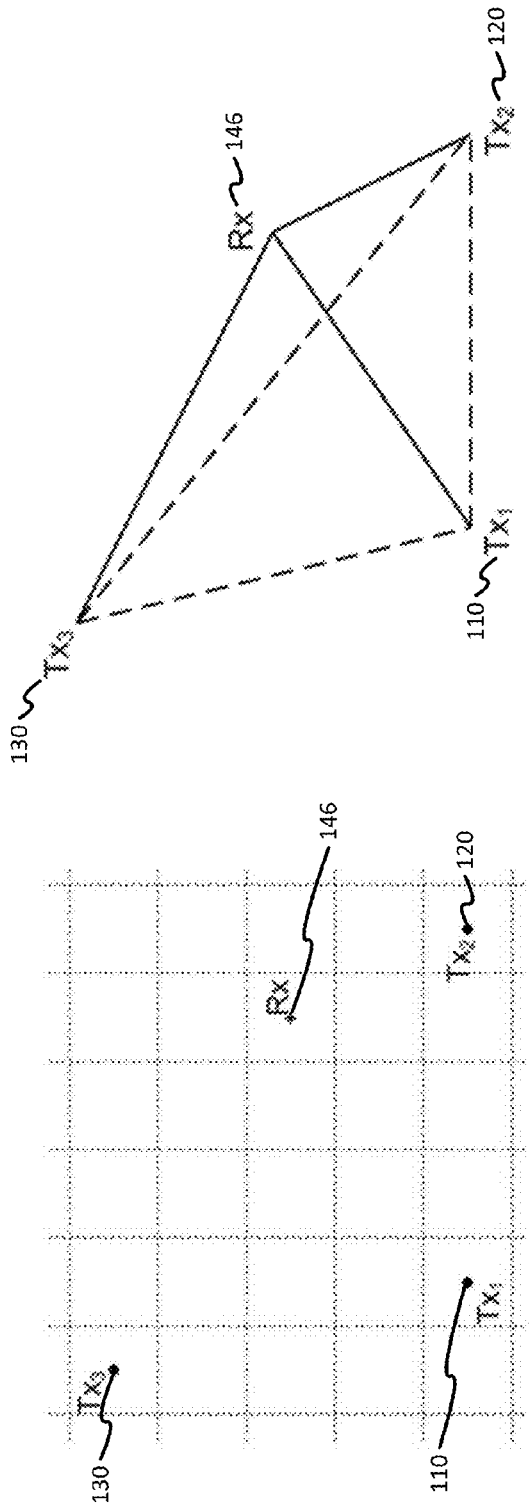

US 9,945,931 B2

TECHNIQUES FOR NAVIGATING UAVS USING GROUND-BASED TRANSMITTERS

PRIORITY CLAIM

This application claims the benefit of U.S. Provisional Patent Application No. 62/091,292, entitled "TECHNIQUES FOR NAVIGATING UAVs USING GROUND-BASED TRANSMITTERS," filed on Dec. 12, 2014, the contents of which are incorporated herein by reference in their entirety.

TECHNICAL FIELD

The present disclosure is generally related to techniques for navigating unmanned aerial vehicles (UAVs), and more particularly to techniques for navigating UAVs using signals transmitted by ground-based transmitters.

BACKGROUND

In recent years, unmanned aerial vehicles (UAVs) have become increasingly accessible to the public. This has enabled commercial and industrial entities to explore ways that UAVs may be used to improve the services that they provide. Traditionally, UAVs include positioning systems that allow the UAV to navigate using signals received from satellites, such as global positioning system (GPS) signals transmitted from GPS satellites. These signals are weak in power and may be degraded due to natural causes (e.g., ionospheric scintillation) and shadowing caused by terrain (e.g., canyons) or structures (e.g., tall buildings). Thus, the environments in which certain commercial and industrial deployments would be desired, such as urban deployments, warehouse or factory deployments, exploratory deployments, etc., may limit the use of UAVs due to potentially poor signal conditions.

Additionally, due to the relatively weak strength of the signals from satellite based transmitters, such signals are susceptible to detrimental interference, which may include deliberate interference (e.g., spoofing) and/or inadvertent interference (e.g., jamming due to radio frequency interference). For example, it is possible to supplant the signals from the satellite based transmitters by transmitting more powerful spoofing signals that mimic authentic GPS satellite signals, thereby deceiving the UAV's positioning system with respect to the true position of the UAV. Such detrimental interference may cause the UAV to deviate from its intended flight plan, abort the flight, be hijacked (e.g., deliberately taken off course by spoofing), or even cause the UAV to crash. Thus, while UAVs provide potentially promising applications in commercial and industrial settings, techniques for navigating the UAVs may not provide sufficient reliability for the environments in which those deployments may be desired.

SUMMARY

Systems, methods, apparatuses and computer-readable storage media for navigating an unmanned aerial vehicle (UAV) using signals of opportunity are disclosed. The UAV may include a receiver for detecting a plurality of signals at two or more receive antennas. The UAV may estimate an angle of arrival (AoA) for at least two signals of the plurality of signals, and may estimate a position of the receiver based, at least in part, on the AoA for each of the at least two signals. In embodiments, known locations of the transmitters that are transmitting the at least two signals may be used in conjunction with the AoAs to determine the estimate of the position of the receiver. In embodiments, more than two signals may be used to localize the estimated position of the receiver.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 5A is a diagram illustrating an embodiment of techniques for calculating the phase difference in connection with a wireless signal received at two antennas FIG. 6A is a diagram illustrating three ground-based transmitters (G-B TXs) with known positions and a receiver with an unknown position;

FIG. 6B is a diagram illustrating an embodiment of defining the relationship between a receiver and a plurality of G-B TXs;

FIG. 6C is a diagram illustrating an embodiment of analyzing a relationship between a receiver and locations of G-B TXs

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
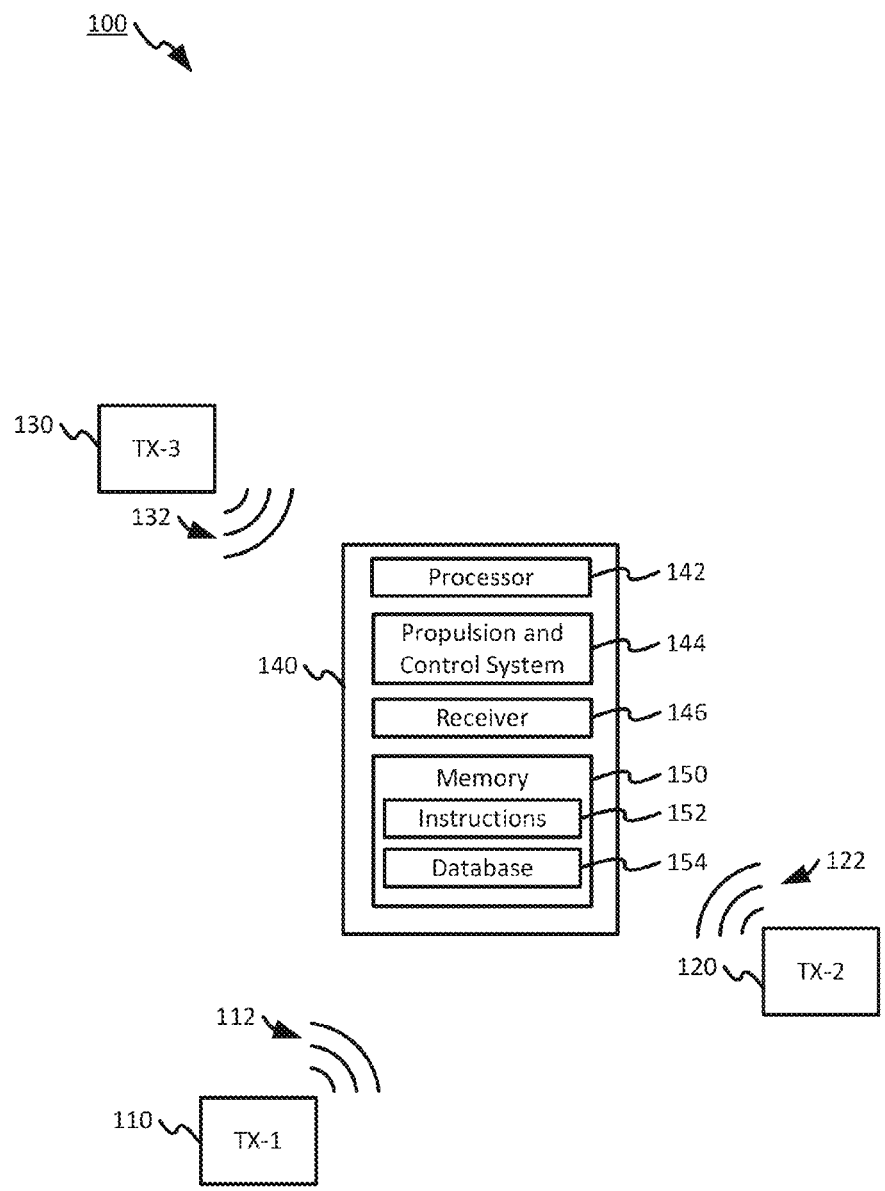
FIG. 1 is a block diagram of a system for facilitating navigation of an unmanned aerial vehicle (UAV) using signals transmitted by ground-based transmitters.

Referring to FIG. 1, a block diagram of a system for facilitating navigation of an unmanned aerial vehicle (UAV) using signals transmitted by ground-based transmitters is shown as a system 100. As shown in FIG. 1, the system 100 includes a UAV 140. In an embodiment, the UAV 140 may be an aircraft adapted to navigate from a point of origin to a destination via the air. In an additional or alternative embodiment, the UAV 140 may be watercraft adapted to navigate from the point of origin to the destination via a body water, which may include watercraft designed to travel along the surface of the water, watercraft designed to travel beneath the surface of the water (e.g., a submersible watercraft), or a watercraft designed to travel both along the surface and below the surface of the water. In yet another additional or alternative embodiment, the UAV 140 may be a land-based vehicle designed to navigate from the point of origin to the destination via the ground. In still another additional or alternative embodiment, the UAV 140 may be a vehicle designed to travel using two or more of mediums such as air, water, and land. For example, the UAV 140 may be a hovercraft adapted for navigation over both water and land.

The UAV 140 may include a processor 142, a propulsion and control (PAC) system 144, a receiver 146, and a memory 150. The processor 142 may be a central processing unit (CPU), a digital signal processor, an application specific integrated circuit (ASIC), or other circuitry. In an embodiment, the processor 142 may include more than one processor. In an additional or alternative embodiment, the processor 142 may be a multi-core processor and may include two or more processing cores.

The memory 150 may include read only memory (ROM), random access memory (RAM), flash memory, magnetoresistive random access memory (MRAM), one or more hard disk drives (HDDs), one or more solid state drives (SSDs), other forms of memory configured to store information in a persistent and/or non-persistent state, or any combination thereof. The memory 150 may store instructions 152. The instructions 152, when executed by the processor 142, cause the processor 142 to perform the operations described in connection with the UAV 140 with reference to FIGS. 1-9K. A database 154 may be stored at the memory 150. The database 154 may store information that may be used to aid in the navigation of the UAV 140, as described in detail below.

The PAC system 144 may include various control systems (e.g., steering systems, flight management systems, actuators, servos, etc.), propulsion systems (e.g., motors, propellers, drive systems, fuel systems, etc.), power systems (e.g., power supply, power transmission relays, generators, etc.), sensors (e.g., an altimeter, a barometer, a pressure sensor, accelerometers, etc.), and other components adapted to enable the UAV 140 to travel during navigation from the point of origin to the destination. In an embodiment, the database 154 may store plan information that identifies the point of origin and the destination, and the plan information may be accessed by the PAC system 144 during navigation of the UAV 140 from the point of origin to the destination, such as for determining course and heading information, steering the UAV 140, etc.

The receiver 146 may include two or more antennas adapted to receive wireless signals. In an embodiment, the receiver 146 may include receiving logic adapted to process the received wireless signals. In an additional or alternative embodiment, the processor 142 may process the received wireless signals. In an embodiment, the two or more antennas may be configured to receive broadcast signals, such as frequency modulated (FM) radio signals (e.g., wireless signals in the 88 MHz to 108 MHz band with 200-kHz channel spacing), amplitude modulated (AM) radio signals, global positioning system (GPS) signals, ultrasonic and other acoustic signals, or a combination thereof.

The UAV 140 may be configured to utilize navigation techniques that leverage wireless transmissions from ground-based transmitters when navigating the UAV 140 from the point of origin to the destination. For example, in FIG. 1, a first ground-based transmitter (G-B TX) 110 (labeled TX-1 in FIG. 1), a second G-B TX 120 (labeled TX-2 in FIG. 1), and a third G-B TX 130 (labeled TX-3 in FIG. 1). In an embodiment, the first G-B TX 110, the second G-B TX 120, and the third G-B TX 130 may be FM radio broadcast transmitters, and may broadcast wireless signals that may be received at the receiver 146. For example, the first G-B TX 110 may transmit a first wireless signal 112 that may be received at the receiver 146, the second G-B TX 120 may transmit a second wireless signal 122 that may be received at the receiver 146, and the third G-B TX 130 may transmit a third wireless signal 132 that may be received at the receiver 146. Additionally, it is noted that other G-B TXs may be broadcasting wireless signals that may be received by the receiver 146, but are not shown or described herein for simplicity of the disclosure. Further, it is noted that some of the wireless signals received from G-B TXs may not be suitable for use in navigation of the UAV 140. For example, some of the wireless signals may be received from G-B TXs that are distant from the UAV 140 and are distorted due interference (e.g., interference from stronger wireless signals, environmental interference, and/or other factors).

During navigation, the UAV 140 may be configured to leverage the wireless signals 112, 122, 132 broadcast from the G-B TXs 110, 120, 130, respectively, to approximate a current location of the UAV 140, thereby enabling the UAV 140 to navigate from the point of origin to the destination. The UAV 140 may approximate the current location of the UAV 140 based, at least in part, on a characteristic of the received wireless signals. For example, in an embodiment, the UAV 140 (i.e., the processor 142 or the receiver 146) may determine an angle of arrival of the wireless signals 112, 122, 132. The angle of arrival for each of the wireless signals may then be correlated to location information associated with each of the G-B TXs 110, 120, 130. For example, in the United States, the Federal Communications Commission (FCC) maintains a public database containing the frequency, transmit power, and longitude/latitude information for each broadcast transmitter. At least a portion of this information (e.g., a portion including the frequency, transmit power, and/or longitude/latitude information for each broadcast transmitter/G-B TX) in an area in which the UAV 140 may be operated may be stored at the database 154.

Navigation of the UAV 140 using signals transmitted by the broadcast transmitters identified in the database 154 may be beneficial over other wireless signals, such as GPS. For example, most metropolitan areas have many (e.g., 10 or more) very strong (e.g., 80+ dBu) FM signal sources, and in some metropolitan areas, such as Kansas City, Mo., up to 17 very strong or extremely strong (100+ dBu) signals can be received in the FM band. Thus, for deployment of UAVs configured according to embodiments, such as the UAV 140, infrastructure utilized to navigate the UAVs, such as the G-B TXs already exists, thereby reducing the costs to deploy UAVs in a commercial or industrial setting. Additionally, because the strength of such wireless signals (e.g., FM broadcast signals) is high relative to other signals, such as GPS signals, the likelihood that the signal can be spoofed is reduced, thereby providing a more secure method of operating UAVs in some environments. Additionally, due to the signal strength of such wireless signals, UAVs may be deployed in environments where GPS navigation techniques are not feasible, such as within buildings. Thus, UAVs deployed according to one or more of the embodiments disclosed herein provide navigation techniques for UAVs that enable autonomous operation of UAVs at reduced cost (e.g., by using existing infrastructure, such as FM broadcast transmitters), and in areas where UAV deployments may not be feasible using navigation techniques that rely on GPS. Additional details regarding embodiments of navigation techniques utilizing broadcast signals, and the advantages of such navigation techniques are described below.

Figure 3:
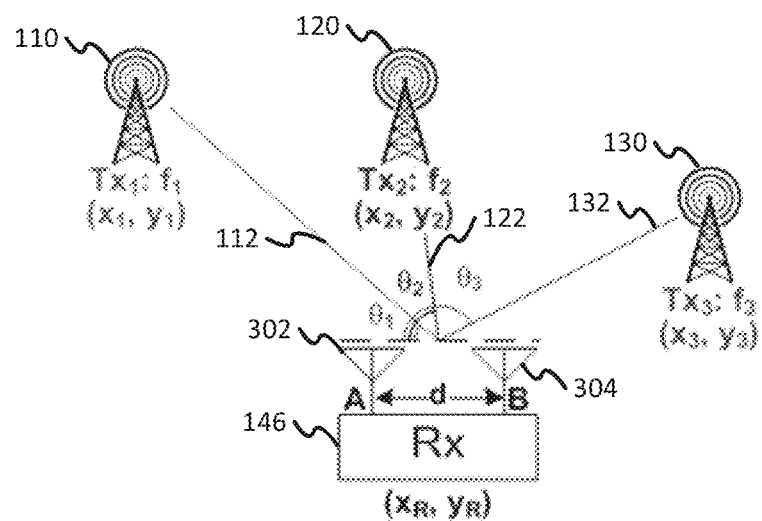
FIG. 3 is a block diagram of an embodiment of a receiver adapted for use in navigation of a UAV based on angles of arrival associated with received wireless signals.

As briefly described above, in an embodiment, the UAV 140 may approximate the current location of the UAV 140 based on an angle of arrival (AoA) of the wireless signals 112, 122, 132. In an embodiment, to facilitate the use of AoAs for approximating the current location of the UAV 140, the two or more receive elements of the receiver 146 may be spatially distributed or separated. For example, and referring to FIG. 3, a block diagram of an embodiment of a receiver adapted for use in navigation of a UAV based on angles of arrival associated with received wireless signals is shown. In FIG. 3, the first G-B TX 110, the second G-B TX 120, and the third G-B TX 130 of FIG. 1 are shown. Additionally, in FIG. 3, the receiver 146 of FIG. 1 is shown and includes a plurality of receiver elements, shown in FIG. 3 as a first antenna 302 and a second antenna 304. It is noted that in an embodiments, the plurality of receiver elements may be a plurality of transducers, rather than antennas (e.g., when acoustic signals are used for position determinations). In an additional or alternative embodiment, the plurality of receiver elements may include a combination of antennas and transducers to provide for more robust navigation of the UAV 140. For example, using antennas and transducers may increase the types of wireless signals (e.g., optical signals, wireless radio frequency (RF) signals, acoustic signals, etc.) that the UAV 140 may utilize in determining the current location of the UAV 140, which may be beneficial in some deployments of the UAV 140, such as when the UAV 140 is deployable in multiple mediums (e.g., land, sea, or air based deployments and under water deployments).

The first antenna 302 and the second antenna 304 may be separated by a predetermined distance (d) termed the receiver baseline. The wireless signals 112, 122, 132 may be received by the antennas 302, 304, and each of the wireless signals 112, 122, 132 may be associated with a particular AoA. For example, in FIG. 3, the first wireless signal 112 may be associated with a first AoA ($\theta_1$), the second wireless signal 122 may be associated with a second AoA ($\theta_2$), and the third wireless signal 132 may be associated with a third AoA ($\theta_3$). Additionally, as shown in FIG. 3, the first G-B TX 110 may have a first location ($x_1$, $y_1$) and the first wireless signal 112 may be associated with a first transmission frequency ($f_1$), the second G-B TX 120 may have a second location ($x_2$, $y_2$) and the second wireless signal 122 may be associated with a second transmission frequency ($f_2$), and the third G-B TX 130 may have a first location ($x_3$, $y_3$) and the third wireless signal 132 may be associated with a third transmission frequency ($f_3$). In an embodiment, the first location, the second location, and the third location may be stored in a database (e.g., the database 154 of FIG. 1).

Referring back to FIG. 1, in an embodiment, the UAV 140 (i.e., the processor 142 or the receiver 146) may process the wireless signals 112, 122, 132 prior to determining the AoA (e.g., $\theta_1$, $\theta_2$, and $\theta_3$, of FIG. 3) for each of the wireless signals 112, 122, 132. In an embodiment, the receiver 146 may include a receiver subsystem adapted to capture information associated with the wireless signals 112, 122, 132. In an additional or alternative embodiment, the receiver 146 may include a dedicated receiver subsystem for each of the two or more receive antennas. Processing the wireless signals may include capturing a time series representation of the received band-limited signals to form a real-valued time-domain signal vector. In an embodiment, the processing of the wireless signals 112, 122, 132 may include signal frequency down-conversion (e.g., using a local oscillator and mixer). In an additional or alternative embodiment, the processing of the wireless signals 112, 122, 132 may include direct sampling of the wireless signals 112, 122, 132. In yet another additional or alternative embodiment, processing of the wireless signals 112, 122, 132 may include under-sampling the wireless signals 112, 122, 132 using an appropriately selected sampling frequency. In embodiment, appropriately selected sample frequencies may be sample frequencies that alias a band of interest (e.g., 88 to 108 MHz) down to baseband without creating ambiguities caused by spectral folding (or aliasing) frequencies within the band on top of one another. For example, a sampling frequency of 80 MHz has Nyquist zone boundaries at 40 MHz, 80 MHz, 120 MHz, etc. The 88 to 108 MHz band (e.g., the FM radio frequency band) may be aliased to 8 MHz to 28 MHz through the use of this under-sampling process.

The UAV 140 may analyze the processed wireless signals 112, 122, 132 to identify the frequencies of each of the respective wireless signals 112, 122, 132. For example, signals from a band (e.g., an FM radio frequency band) containing multiple transmitter frequencies are collected simultaneously from each of the two or more antennas of the receiver 146 and analyzed to determine the signal frequency and signal power. Frequencies with significant signal power are identified using the information stored in the database 150 (e.g., the information associated with the G-B TXs 110, 120, 130). In an embodiment, the UAV 140 may be configured to select a number the identified frequencies for use in determining the current location of the UAV 140. For example, in an embodiment, the UAV 140 may select two or more of the identified frequencies for use in determining the current location of the UAV 140. In an embodiment, the number of identified frequencies that are selected may be configured according to a desired accuracy of the determined location, where the number of identified frequencies that are selected increases as the desired accuracy increases. In an embodiment, during navigation of the UAV 140, if the number of identified frequencies drops below a threshold number of frequencies (e.g., two frequencies), the UAV 140 may be configured to halt movement and/or return to the point of origin. For example, when the number of identified frequencies drops below the threshold number of frequencies, the UAV 140 may be incapable of accurately determining the location of the UAV 140, thereby reducing the likelihood that further operation or travel of the UAV 140 will continue along an intended path, or within a threshold distance of the intended path. In such instances, the UAV 140 may be configured to halt operations and/or return to the point of origin.

In an additional or alternative embodiment, when the number of identified frequencies drops below the threshold number of frequencies, the UAV 140 may alter its intended path in an attempt to bypass the area in which the threshold number of frequencies cannot be satisfied. For example, the UAV 140 may cross-reference the UAV 140's current location with the location information associated with the G-B TXs in the database 150 to determine whether an alternate route to the destination may be identified, where the number of frequencies that may be identified during travel along the alternate route is predicted to satisfy the threshold number of frequencies, thereby enabling the UAV 140 to dynamically reroute its path of travel in response to deteriorating signal conditions along an initial path of travel. In yet another additional or alternative embodiment, the UAV 140 may include a GPS navigation system, and may initiate navigation along the initial path of travel using the GPS navigation system in response to the deteriorating signal conditions. Subsequently, the UAV 140 may periodically determine whether the threshold number of frequencies may be identified, and may resume navigation using wireless signals from G-B TXs when the threshold number of frequencies has been identified.

Figure 4:
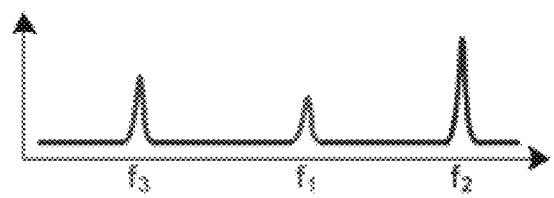
FIG. 4 is a diagram illustrating a result of isolation of and identification of signal frequencies for wireless signals transmitted by a plurality of transmitters according to an embodiment.

For example, and referring to FIG. 4, a diagram illustrating a result of isolation of and identification of signal frequencies for wireless signals transmitted by a plurality of transmitters. In FIG. 4, the signal frequencies that have been isolated include a first frequency $f_1$, a second frequency $f_2$, and a third frequency $f_3$. In an embodiment, the isolated transmission frequencies of FIG. 4 may correspond to the frequencies used by a plurality of G-B TXs, such as the G-B TXs 110, 120, 130 of FIGS. 1 and 3. For example, the first G-B TX 110 may be associated with the first transmission frequency $f_1$, the second G-B TX 120 may be associated with the second transmission frequency $f_2$, and the third G-B TX 130 may be associated with a third transmission frequency $f_3$. The UAV 140 may be adapted to use the isolated transmission frequencies of the wireless signals 112, 122, 132 transmitted by the G-B TXs 110, 120, 130 to approximate the current location of the UAV 140 during navigation.

In an embodiment, spectral analysis of a time-domain signal vector provides a complex frequency-domain signal vector. The frequency-domain received signals are analyzed by frequency and received signal power to identify their respective transmitter parameters including transmit antenna position. To illustrate, in an embodiment, the two or more antennas (e.g., the antennas 302, 304 of FIG. 3) of the receiver 146 that receive the wireless signals 112, 122, 132 from the G-B TXs 110, 120, 130 are spatially separated (e.g., by the receiver baseline d of FIG. 3). The processed wireless signals 112, 122, 132 may be analyzed to measure a phase difference of the received wireless signals 112, 122, 132 at the two or more antennas. The phase difference may be determined by comparing voltage measurements of the processed wireless signals 112, 122, 132 at each of the two or more antennas. The voltage may be determined according to:

$$V(t) = V_m \sin(\omega t + \emptyset).$$  Equation 1

In equation 1, V(t) is the voltage at the antenna element, $V_m$ is the instantaneous signal amplitude in volts, ω is the angular transmitting frequency in radian/second, and ø is the delay of the transmitted signal in radians. Comparing the two signal voltages at two spatially separated antenna elements results in a phase difference of the signal (e.g., one of the wireless signals 112, 122, 132). In this case, the phase of one of the antenna elements (e.g., the 'reference' antenna) provides a reference with respect to the other antenna element (e.g., the 'sense antenna'). In an embodiment, the phase difference may be determined based on an assumption that the G-B TXs 110, 120, 130 are at the same elevation as the UAV 140 (or the receiver 146). For example, the two or more antenna elements may be vertical monopole or dipole antenna elements that exhibit an omnidirectional pattern in the azimuth plane, thereby making the two or more antennas of the receiver 146 equally sensitive to signals arriving from any angles on the azimuth direction. Thus, the AoA of the received wireless signals 112, 122, 132 may be measured in the azimuth plane relative to the UAV 140's frame of reference. For each of the isolated or identified frequencies, an azimuthal angle of arrival (AoA) may be estimated by analyzing the relative phase of each the wireless signals 112, 122, 132, as described with reference to FIGS. 5A-5C.

Referring to FIG. 5A, a diagram illustrating an embodiment of techniques for calculating the phase difference in connection with a wireless signal received at two antennas is shown. In FIG. 5, the antennas 302, 304 of FIG. 3 and a G-B TX is shown. In an embodiment, the GB-TX (labeled TX in FIG. 5) may be the first G-B TX 110, the second G-B TX 120, or the third G-B TX 130 of FIG. 1. It is assumed that the G-B TX is in the far field of the receiver (e.g., the receiver 146 of FIG. 1), allowing the wireless signal received from the G-B TX to be considered a plane wave.

The wireless signal received at the antennas 302, 304 have a phase difference between them due to the wireless signal received at the first antenna 302 travelling an additional path d cos $\theta_{AB}$ compared to that of antenna B. Therefore, the phase at antenna A is greater than that of antenna B by the product of d cos $\theta_{AB}$ and wavenumber k, where k is given by:

$$k = \frac{2\pi}{\lambda}.$$  Equation 2

In equation 2, λ is the wavelength at the transmitting frequency (e.g., f1, f2, or f3 of FIGS. 3 and 4) of the wireless signal transmitted by the G-B TX. The relative phases at antennas 302, 304 are assumed to be $\varphi_A$ and $\varphi_B$, respectively. The phase difference $\varphi_{AB}$ between the antennas 302, 304 with respect to the wireless signal received from the G-B TX may be given by:

$$\varphi_{AB} = kd \cos \theta_{AB}.$$  Equation 3

In equation 3, k is the wavenumber derived in equation 2, d is the receiver baseline, and $\theta_{AB}$ is the AoA of the signal being transmitted by the G-B TX in FIG. 5. It is noted that $\varphi_{AB}$ may be expressed as:

$$\varphi_{AB} = \varphi_A - \varphi_B.$$  Equation 4

In equation 4, $\varphi_A$ is the phase of the wireless signal transmitted by the G-B TX at the first antenna 302 and $\varphi_B$ is the phase of the wireless signal transmitted by the G-B TX at the second antenna 304. Based on equations 2-4, the AoA of the received wireless signal may be derived based on the relative phase difference between the two antennas and the wavelength at the transmitting frequency according to:

$$\theta_{AB} = \cos^{-1}\left(\frac{\lambda}{2\pi d} \varphi_{AB}\right).$$  Equation 5

Figure 5B:
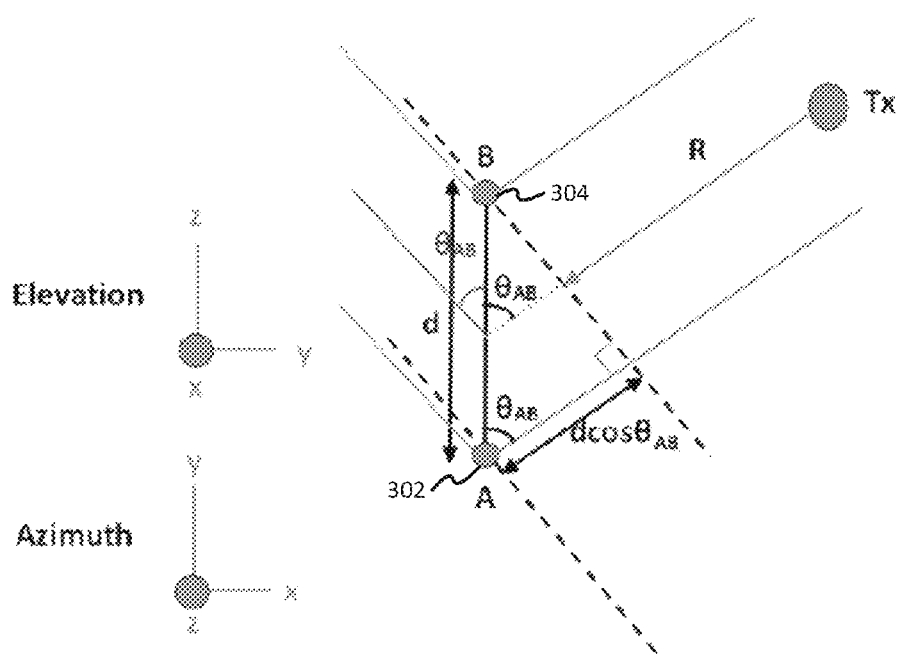
FIG. 5B is a diagram illustrating the ambiguity that may occur when a single receiver baseline is used according to embodiments.
Figure 5C:
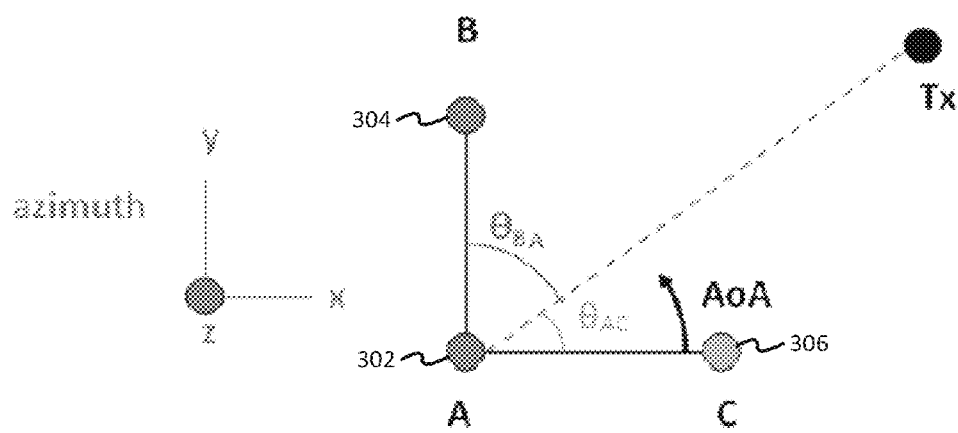
FIG. 5C is a diagram illustrating an embodiment of a receiver configuration that uses more than one receiver baseline to eliminate ambiguity with respect to an AoA of a received signal

In equation 5, d is constrained to $$d \leq \frac{\lambda}{2},$$

and λ is the free space wavelength at the transmitting frequency of the GB TX. In an embodiment, deriving the AoA for the received wireless signals 112, 122, 132 using a single receiver baseline (e.g., d of FIG. 3), as in equations 2-5, may not resolve the ambiguity between (0, π) and (0, -π). FIG. 5B is a diagram that illustrates the ambiguity that may occur when a single receiver baseline is used according to embodiments. In such instances, additional receiver baselines may be used to eliminate the ambiguity. In an embodiment, the receiver baseline and the additional baselines may be non-collinear. FIG. 5C is a diagram that illustrates an embodiment of a receiver configuration that uses more than one receiver baseline to eliminate ambiguity with respect to an AoA of a received signal. As shown in FIG. 5C, the receiver (e.g., the receiver 146 of FIGS. 1 and 2) of the UAV (e.g., the UAV 140 of FIG. 1) may include the first antenna 302 and the second antenna 304 spatially separated by a first receiver baseline (d), and a third antenna 306.

In FIG. 5C, the reference is the baseline between antennas 302 and 306 (e.g., antenna 306 is a reference antenna with respect to the sense antennas 302, 304), and all calculations of the AoA may be calculated with reference to this baseline. The AoA measured by the antennas 302, 306 may be denoted as $\theta_{AC}$, whereas the AoA measured by the antennas 302, 304 may be denoted as $\theta_{BA}$. It is noted that, in FIG. 5C, that the two AoAs measured by two baselines will have a 90° difference between them due to two baselines having a perpendicular orientation with respect to each other in the azimuth. Therefore, the ambiguity of AoA between (0, π) and (0, -π) may be eliminated. In the FIG. 5C, both $\theta_{BA}$ and $\theta_{AC}$ are between 0° and 90°, and the AoA of the received signal is positive for both baselines. However, $\theta_{BA}$ and $\theta_{AC}$ are separated by 90°. Therefore, $\theta_{BA}$ may be shifted by 90° to match the baseline of the antennas 302, 306 that should be the same as $\theta_{AC}$. Finer accuracy in calculating the AoA may be achieved using an average value of $\theta_{AC}$ and the shifted $\theta_{BA}$. For example, the AoA may be given by:

$$AoA = \frac{\theta_{AC} + |90° - \theta_{BA}|}{2}.$$  Equation 6

Thus, FIGS. 5A-5C illustrate various embodiments for determining AoA of a received wireless signal (e.g., one of the received wireless signals 112, 122, 132 of FIG. 1). As described in more detail below, the AoA of the received wireless signal may be used to determine a current position of a UAV (e.g., the UAV 140 of FIG. 1).

The UAV 140 may use the known locations of the G-B TXs 110, 120, 130 (e.g., the first location, the second location, and the third location of FIG. 3) in conjunction with the AoAs determined for each of the received wireless signals 112, 122, 132 to approximate the UAV 140's current location. To illustrate, and with reference to FIG. 6A, a diagram illustrating three G-B TXs with known positions and a receiver with an unknown position are shown. In an embodiment, the three G-B TXs of FIG. 6 may correspond to the G-B TXs 110, 120, 130 of FIG. 1, and the receiver may correspond to the receiver 146 of FIG. 1. The position of the receiver may be determined by defining a relationship between the receiver at the unknown position and the known locations of the G-B TXs.

For example, and with reference to FIG. 6B, a diagram illustrating an embodiment of defining the relationship between a receiver and a plurality of G-B TXs is shown. As shown in FIG. 6B, the relationship between the receiver and the plurality of G-B TXs may be expressed as triangles defined such that each triangle consists of the receiver's position and the positions of one G-B TX pair. For example, as shown in FIG. 6B, a plurality of triangles may be defined to express the relationship between a receiver (e.g., the receiver 146 of FIG. 1) and three G-B TXs (e.g., the G-B TXs 110, 120, 130 of FIG. 1). In FIG. 6B, the plurality of triangles include a first triangle defined with respect to the unknown position of the receiver 146 and the positions of the first G-B TX 110 and the second G-B TX 120, a second triangle defined with respect to the unknown position of the receiver 146 and the positions of the second G-B TX 120 and the third G-B TX 130, and a third triangle defined with respect to the unknown position of the receiver 146 and the positions of the first G-B TX 110 and the third G-B TX 130. In an embodiment, each triangle may be analyzed based, at least in part, on the known locations of the G-B TXs 110, 120, 130.

For example, and with reference to FIG. 6C, a diagram illustrating an embodiment of analyzing a relationship between a receiver and locations of G-B TXs is shown. It is noted that, while FIG. 6C is described with reference to analyzing a relationship between the receiver (e.g., the receiver 146 of FIG. 1) and the locations of two G-B TXs (e.g., the G-B TXs 110, 120 of FIG. 1), the analysis may be applied to relationships of relationships of the receiver and locations of other G-B TXs. For example, in FIG. 6C, the first triangle of FIG. 6B representative of the relationship between the receiver 146 and the G-B TXs 110, 120 is shown. However, similar analysis to that described below may readily be applied to the relationship between the second triangle of FIG. 6B representative of the relationship between the receiver 146 and the G-B TXs 120, 130, and/or the relationship between the third triangle of FIG. 6B representative of the relationship between the receiver 146 and the G-B TXs 110, 130.

In an embodiment, as illustrated in FIG. 6C, the first triangle of FIG. 6B is representative of the relationship between the receiver 146 and the G-B TXs 110, 120 may be analyzed using the law of sines according to:

$$\frac{a}{b} = \frac{\sin A}{\sin B}, \frac{b}{c} = \frac{\sin B}{\sin C}, \frac{a}{c} = \frac{\sin A}{\sin C}.$$ Equation 7

In equation 7, a represents the distance between the G-B TXs 110, 120, which may be determined using the known locations of the G-B TXs 110, 120 (e.g., based on the information stored in the database 150 of FIG. 1), b represents the distance between the first G-B TX 110 and the receiver 146, c represents the distance between the second G-B TX 120 and the receiver 146, and B and C represent the AoAs of the wireless signals 112, 122, respectively. In an embodiment, the AoA of the wireless signals received at the receiver 146 from the G-B TXs 110, 120, respectively, may be determined, as described with reference to FIGS. 5A-5C. In an embodiment, the AoAs may be referenced to the receiver 146's antenna geometry, and the orientation of the receiver 146's antenna geometry relative to the G-B TXs 110, 120 position framework may be unknown. In an embodiment, a differential Angle of Arrival (dAoA) may be used to remove the reference to the orientation of the receiver 146's antenna geometry.

Figure 7A:
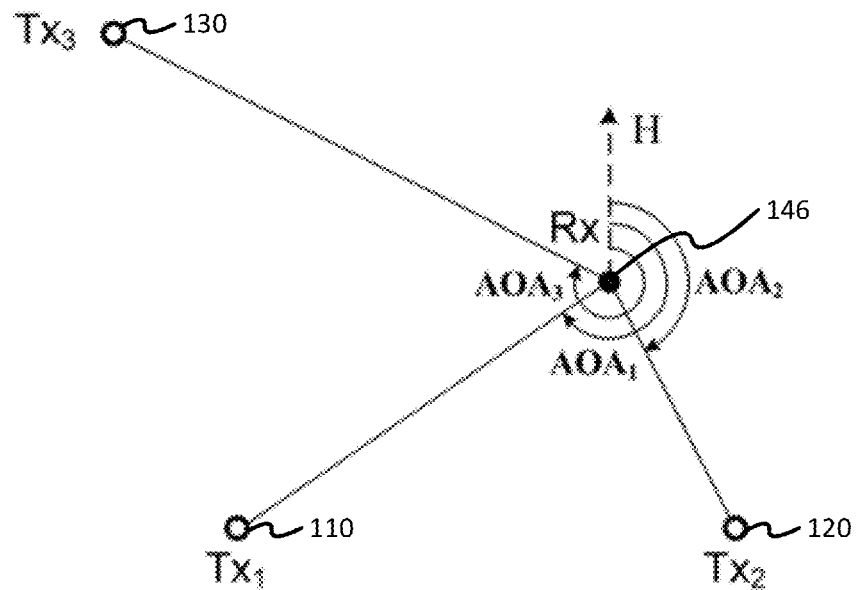
FIG. 7A is a diagram illustrating an embodiment of removing the reference to an orientation of a receiver's antenna geometry relative to a position framework for a plurality of G-B TXs.

To illustrate, referring to FIG. 7A, a diagram illustrating an embodiment of removing the reference to an orientation of a receiver's antenna geometry relative to a position framework for a plurality of G-B TXs is shown. In FIG. 7A, the AoAs of wireless signals (e.g., the wireless signals 112, 122, 132 of FIG. 1) received from a plurality of G-B TXs (e.g., the G-B TXs 110, 120, 130 of FIG. 1) are shown relative to a reference direction (H). The reference direction (H) may be arbitrarily selected, so long as it is consistent. For example, the reference direction (H) may be the axis of the UAV 140 in a direction that the UAV 140 is travelling. As another example, the reference direction (H) may be the baseline between the antennas 302, 304. In an embodiment, the reference direction (H) may be a mechanical or geometric line or plane reference for angle measurement. In FIG. 7A, the AoA of the first wireless signal 112 transmitted by the first G-B TX 110 is shown as $AoA_1$, the AoA of the second wireless signal 122 transmitted by the second G-B TX 120 is shown as $AoA_2$, and the AoA of the third wireless signal 132 transmitted by the third G-B TX 110 is shown as $AoA_3$. The reference to the orientation of the receiver's antenna geometry may be removed using differential AoAs (dAoAs).

Figure 7B:
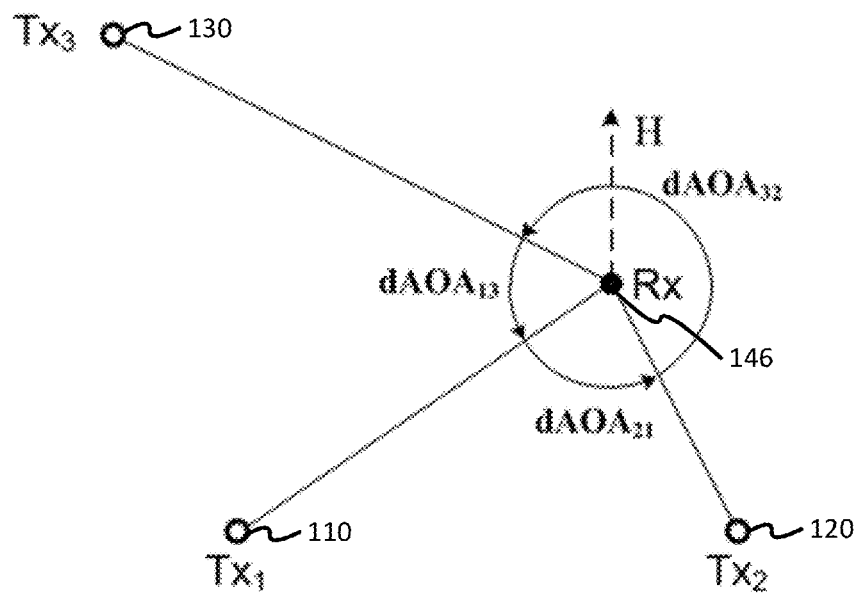
FIG. 7B is a diagram illustrating an embodiment of determining differential AoAs (dAoAs) for a plurality of wireless signals received from a plurality of G-B TXs.

For example, and referring to FIG. 7B, an embodiment of determining differential AoAs (dAoAs) for a plurality of wireless signals received from a plurality of G-B TXs is shown. In FIG. 7B, a first dAoA ($dAoA_{21}$), a second dAoA ($dAoA_{32}$), and a third dAoA ($dAoA_{13}$) are shown. The dAoAs may be given by:

$$dAoA_{xy} = AoA_x - AoA_y.$$ Equation 8

Thus, it can be seen from equation 8 that $dAoA_{21} = AoA_2 - AoA_1$, $dAoA_{32} = AoA_3 - AoA_2$, and $dAoA_{13} = AoA_1 - AoA_3$. Using the dAoAs (e.g., $dAoA_{21}$, $dAoA_{32}$, $dAoA_{13}$), a locus of points representing possible positions of the receiver 146 may be calculated.

Figure 7C:
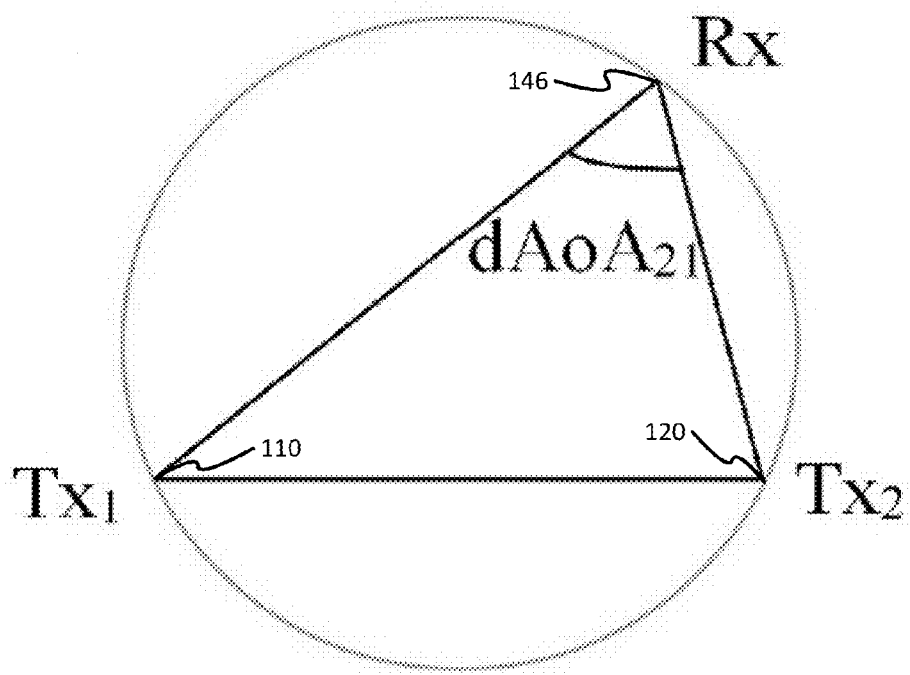
FIG. 7C is a diagram illustrating an embodiment of determining a locus of points representing possible positions of a receiver using dAoAs.

For example, and with reference to FIG. 7C, an embodiment of determining a locus of points representing possible positions of a receiver using dAoAs is shown. In FIG. 7C, the first triangle of FIG. 6C, which representative of the relationship between the receiver 146 and the G-B TXs 110, 120, is shown, and A of FIG. 6C has been set to $dAoA_{21}$. In an embodiment, $dAoA_{21}$ may be determined using equation 8. In an embodiment, the locus of points representing possible positions of the receiver may be determined using the law of sines and triangulation. For example, assume a series of values (b) for B (e.g., the angle B of FIG. 6C) range from 0° to 360°. For each assumed value of B, solve for C (e.g., the angle C of FIG. 6C) according to:

$$C = 180° - A - B, \text{ where } A = dAoA_{21}.$$ Equation 9

In an embodiment, b may be given by:

$$b = a\frac{\sin B}{\sin A},$$  Equation 10 where a is the distance between the first G-B TX 110 and the second G-B TX 120.

Figure 7D:
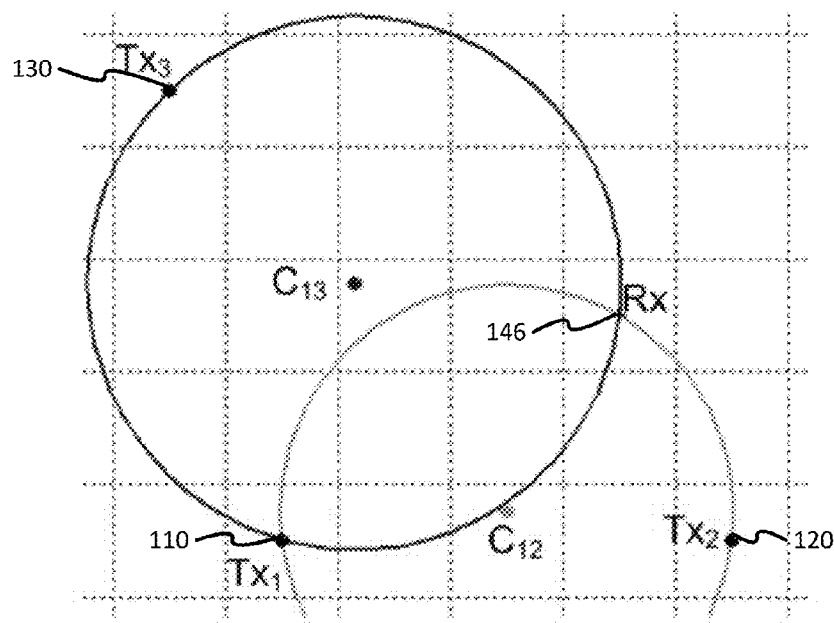
FIG. 7D is a diagram illustrating localization of a receiver location according to embodiments.
Figure 7E:
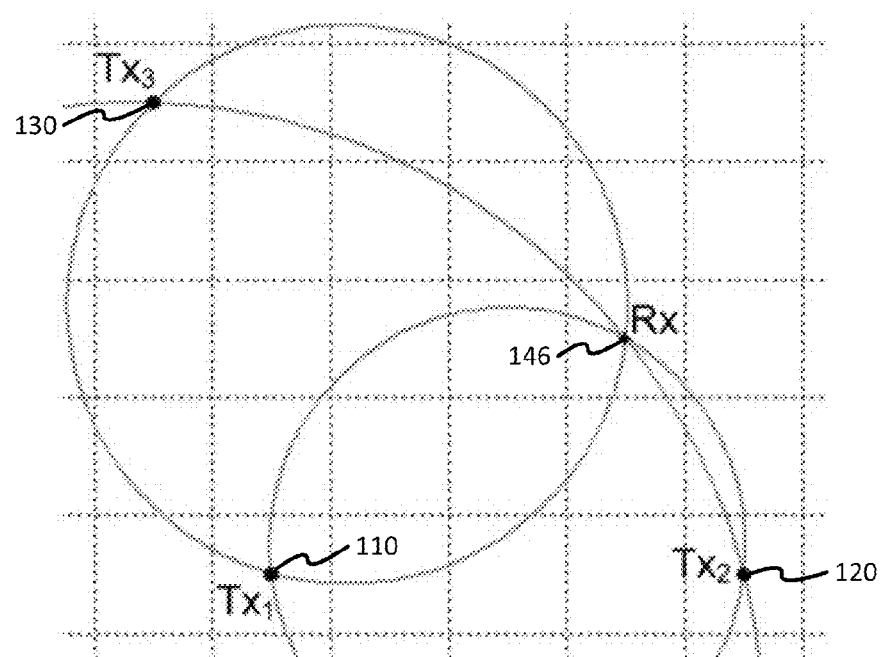
FIG. 7E is a diagram illustrating an embodiment of localizing a position of a receiver according to embodiments.

As shown in FIG. 7C, the locus of points for the possible position of the receiver 146 takes the form of a circle that passes through the two known G-B TX positions (e.g., the locations of the G-B TXs 110, 120) and the unknown position of the receiver 146. Thus, the dAoA from one pair of G-B TXs provides a locus of points that contain the possible position of the receiver 146. In an embodiment, the position of the receiver 146 may be localized from a circle, as shown in FIG. 7C, to a single point in space using one or more additional G-B TX pairs (e.g., G-B TX 110, 130). For example, $dAoA_{31}$ may be determined and used to generate another circle that passes through the positions of the G-B TXs 110, 130 and the unknown position of the receiver 146, as shown in FIG. 7E. The points of intersection of the two circles coincide with the position of the first G-B TX 110 and the position of the receiver 146. The accuracy of the position estimate of the receiver 146, as determined using two circles, may be augmented by introducing circles defined using other dAoAs (e.g., $dAoA_{32}$) associated with other G-B TX pairs (e.g., G-B TXs 120, 130) and finding the intersection points.

Figure 8A:
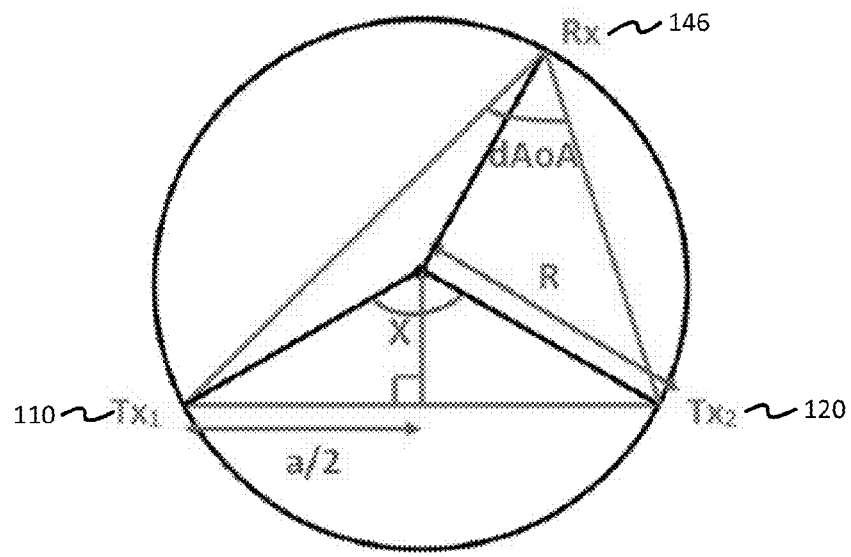
FIG. 8A is a diagram illustrating an embodiment for estimating a position of a receiver relative to the known G-B TX positions.

Referring to FIG. 8A, a diagram illustrating an embodiment for estimating a position of a receiver relative to the known G-B TX positions is shown. In FIG. 8A, the first triangle of FIG. 6C, which representative of the relationship between the receiver 146 and the G-B TXs 110, 120, and the $dAoA_{21}$ described with reference to FIGS. 7B and 7C are shown. In FIG. 8A, the circle has a radius (R), and an angle (X) is shown, where X is the angle formed at the center of the circle relative to the G-B TXs 110, 120. In an embodiment, the relation between the X and $dAoA_{21}$ may be given by:

$$X = 2dAoA_{21}.$$  Equation 11

As shown in FIG. 8A, a perpendicular line that extends from the center of the circle to the baseline length a of the G-B TX pair may be defined that dissects both the baseline length a and X. The relationship between X and the baseline length a may be derived according to:

$$\sin\frac{x}{2} = \frac{a}{2R}.$$  Equation 12

From equations 11 and 12, it can be seen that the relationship between R, a, and $dAoA_{21}$ may be given by:

$$R = \frac{a}{2\sin dAoA_{21}}.$$  Equation 13

Figure 8B:
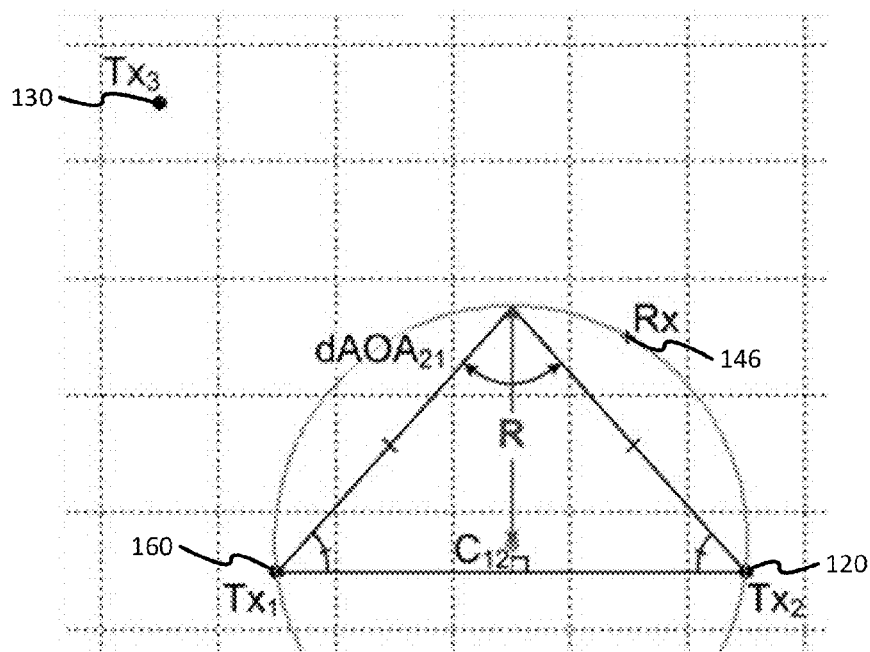
FIG. 8B is a diagram illustrating an embodiment of extending a line segment perpendicular to the midpoint of the baseline a between the G-B TX pair for use in determining a location of a receiver according to embodiments.
Figure 8C:
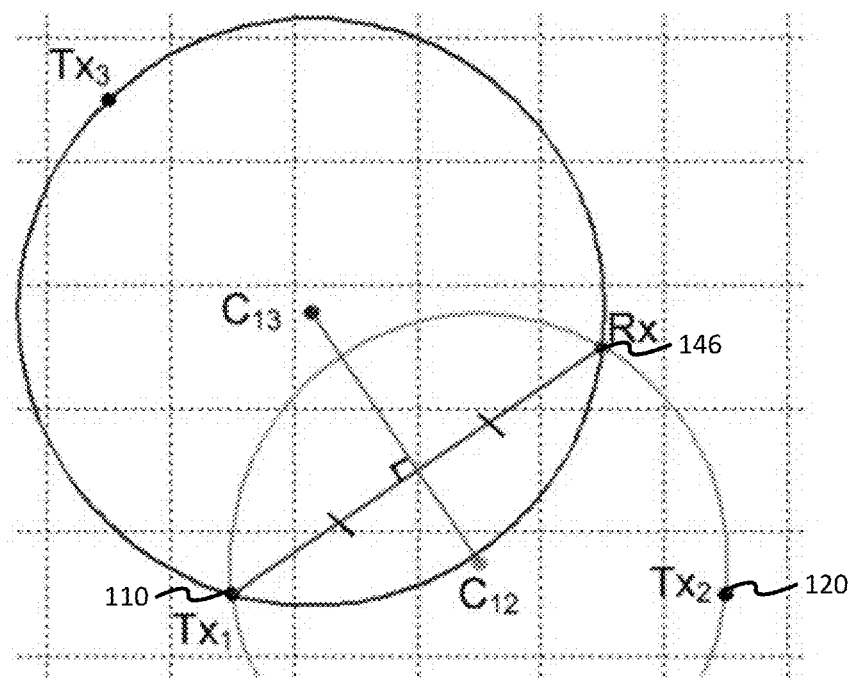
FIG. 8C is a diagram illustrating an embodiment of estimating a position of a receiver by mirroring a transmitter position common about a line connecting centers of two circles.

In an embodiment, the center of the circle may be found by extending a line segment perpendicular to the midpoint of the baseline a between the G-B TX pair, as shown in FIG. 8B, and then the estimated position of the receiver 146 may be found by mirroring the transmitter position common to both circles about the line connecting the centers of the two circles, as shown in FIG. 8C. It is noted that, the accuracy of the position estimate may depend on the accuracy of the measured AoAs. FIGS. 7D and 7E illustrate position determinations for the receiver 146 similar to the position estimation illustrated in FIG. 8C. Factors affecting the accuracy of the measured AoAs and the accuracy of the position estimates derived therefrom are described below with reference to FIGS. 9A-9K.

Referring back to FIG. 1, during navigation from the point of origin to the destination, the UAV may determine multiple location approximations, as described with reference to FIGS. 3A-8C above, which may be stored at the database 150. After each location determination, the UAV 140 may cross-reference the determined location of the UAV 140 with the flight plan data to verify that the UAV 140 is travelling along an intended path, and may determine one or more navigation operations (e.g., turns, stops, etc.) to be performed by the UAV 140 (e.g., by the PAC system 144) to maintain the UAV 140's path of travel along the intended path. In an embodiment, the UAV 140 may periodically determine ground speed and heading using a time-series analysis of the periodic location determinations stored in the database 150. It is to be appreciated that the system 100 provides for autonomous navigation of the UAV 140, thereby enabling the UAV 140 to travel along the intended path without requiring communication with any external systems.

Further, because the wireless signals 112, 122, 132 leveraged by the UAV 140 to determine the current location of the UAV 140 are signals of opportunity (e.g., signals provided by existing G-B TXs, such as FM broadcast transmitters), the system 100 does not require any purpose-built infrastructure prior to deployment in many environments, such as urban settings and some rural settings. Thus, the system 100 may be deployed at a reduced cost relative to some UAV navigation systems. It is noted that, although the system 100 has been described with reference to 3 G-B TXs, less than or more than three G-B TXs may be operated within the environment in some embodiments, and the description provided above with reference to 3 G-B TXs has been provided for purposes of illustration, rather than by limitation. Additionally, although the receiver 146 has been primarily described with reference to two antennas (e.g., the antennas 302, 304 of FIG. 3), in embodiments, the receiver may include more than two antennas. For example, in the embodiment of FIG. 5C, the receiver 146 includes three antennas 302, 304, 306. In other embodiments, the receiver 146 may include more than three antennas.

Additionally, it is noted that, although described with reference to FM radio broadcast signals, the UAV 140 may be configured to leverage other signals of opportunity, such as television broadcast signals, AM radio broadcast signals, cellular network broadcast signals, other radio frequency (RF) transmitters (e.g., wireless fidelity (Wi-Fi) signals), acoustic signals (e.g., ultrasonic signals), or another type of wireless signal (e.g., an optical signal). In an embodiment, when the transmitters transmit optical signals, the transmitters may be optical emitters (e.g., LEDs) that are distinctive based on the color of the emitted light (e.g., visible or infrared), the polarization of the emitted light (e.g., linear vertical, right-handed circular), or on the nature of an applied modulation (e.g., on/off modulation at a subcarrier frequency in the Hz or kHz). Thus, the system 100 may enable deployment of UAVs in environments where other UAV navigation systems, such as UAV navigation system that rely on GPS signals, may not be deployable. For example, unlike UAV navigation systems that rely on GPS signals, which may not reliably be received inside most buildings, the UAV 140 may be deployed inside a building, such as a warehouse or mall, to perform surveillance or for other purposes.

It is further noted that, in some environments, infrastructure may be purpose-built for deployment of the system 100. For example, a plurality of transmitters (e.g., ultrasonic or other forms of acoustic transmitters) may be deployed in a mineshaft or underwater, thereby allowing navigation of the UAV 140 in environments where signals of opportunity (e.g., FM radio, AM radio, cellular, and television broadcast signals) may not be received. In such deployments, the positions of each the plurality of transmitters may be stored in the database. In an embodiment, purpose-built infrastructure transmitters may be fixed frequency narrowband transmitters configured to transmit a signal having continuous waveform (CW). In an embodiment, the locations of the transmitters may be leveraged with 3-dimensional definitions of the operating environment (e.g., a CAD model of a building) to provide safe and efficient navigation within that operating environment. In an additional or alternative embodiment, the UAV may include other sensors (e.g., proximity sensors, infrared sensors, etc.) that enable exploration/discovery of the confines of the operating environment that has been equipped with the transmitters. For example, the other sensors may be configured to determine when the UAV 140 is approaching an obstacle (e.g., a wall, a ceiling, a floor, a shelf, etc.) within the operating environment.

In an embodiment, the current location of the UAV 140 may be determined in a 2-dimensional coordinate system (e.g., latitude/longitude), and the PAC system 144 may provide information regarding altitude of the UAV 140 at the time the current location is determined. For example, an altimeter included in the PAC system 144 may provide the altitude information. As another example, a barometric pressure sensor included in the PAC system 144 may be used to determine the altitude of the UAV 140. Locations determined in a 2-dimensional coordinate system may be suitable for some UAV deployments, such as deployments on the surface of a body of water or on land, and in some instances, aeronautical deployments. However, in some deployments, locations determined using a 3-dimensional coordinate system may be desirable, such as deployments in an urban environment, deployments in an underwater environment, or within a building. Thus, in an additional or alternative embodiment, the current location of the UAV 140 may be determined in a 3-dimensional coordinate system (e.g., latitude/longitude/altitude). For example, when the G-B TXs are located at different elevations, a 3-dimensional position or current location may be determined by the UAV 140. In an embodiment, the 3-dimensional position of the UAV 140 may be determined using a process similar to the process described above for 2-dimensional position determinations, however, the locus of possible receiver positions may form a sphere, rather than a circle. Thus, in an embodiment, the location information associated with the known locations of the G-B TXs stored at the database 150 may include elevation information. For example, in FIG. 3, the locations of the G-B TXs 110, 120, 130 are shown as being associated with locations $(x_1, y_1)$, $(x_2, y_2)$, and $(x_3, y_3)$, respectively. For 3-dimensional position determinations, the locations of the G-B TXs 110, 120, 130, as stored at the database 150, may be $(x_1, y_1, z_1)$, $(x_2, y_2, z_2)$, and $(x_3, y_3, z_3)$, respectively. During positioning determinations, two G-B TX pairs may provide intersecting spheres (yielding a circle), and another G-B TX pair may be used to localize the position on the circle to a point.

The type of current location determination may be accounted for when infrastructure is purpose-built for deployment of UAVs in the system 100. For example, in an underwater infrastructure deployment, it may be desirable to determine the current location of the UAV 140 using a 3-dimensional coordinate system, thereby enabling the UAV 140 to determine whether is approaching the bottom of the body of water in which the UAV 140 is deployed. In such a purpose-built deployment, the G-B TXs may be placed at varying depths in the area of operation to enable the use of the 3-dimensional coordinate system.

In an embodiment, the UAV 140 may use the current location determined based on the signals of opportunity to detect jamming or spoofing of GPS signals. For example, as explained above, GPS signals are relatively weak when compared to other broadcast signals, such as FM radio signals. Therefore, GPS signals are susceptible to jamming and spoofing, which may be used to alter a course of a UAV that is reliant on GPS signals for navigation. Because FM radio signals are relatively strong, it is difficult to jam or spoof such signals. Thus, the UAV 140 may be less susceptible to hijacking (e.g., due to spoofing of GPS signals) or going off course (e.g., due to jamming of GPS signals), thereby making the system 100 more reliable. To detect spoofing or jamming of GPS signals, the UAV 140 may include a GPS signal processing system adapted to receive GPS signals and determine the UAV 140's current position based on the GPS signals. The UAV 140 may periodically compare the positions determined using the signals of opportunity, as described with reference to FIGS. 3A-8C above, to positions determined using the GPS signals. If the two positions do not match to within a threshold distance, the UAV 140 may determine that interference (e.g., jamming and/or spoofing) has compromised the reliability of the GPS signals. This may be beneficial in many applications and deployments of the UAV 140.

For example, the UAV 140 may be adapted to use GPS assisted navigation techniques as a primary navigation technique, but may periodically verify the position of the UAV as determined based on the GPS signals using positions determined using signals of opportunity. If the UAV 140 detects that the GPS signals have been compromised, the UAV 140 may initiate operations to navigate primarily using the positions determined using the signals of opportunity. If the UAV 140 subsequently detects that the GPS signals are no longer suffering from interference, the UAV 140 may return to navigating primarily using positions determined using the GPS signals. As another example, some deployments may require the UAV 140 to operate in environments where the GPS signals may be received only in certain portions of the operating environment, such as outside of a warehouse, shipyard, along a section of a railroad that includes a tunnel, etc. In such deployments, UAVs utilizing navigation techniques that rely upon GPS signals may not be suitable, since they would not be operable in the portions of the operating environment where GPS signals cannot be received. However, as noted above, the UAV 140 may readily be deployed in such environments and may not be hindered from entering areas within the operating environment where GPS signals cannot be received. Thus, the system 100 provides a more robust UAV navigation system.

From the foregoing, it is to be appreciated that the system 100 provides improved navigation techniques for UAVS and enables UAV deployments in a diverse number of environments (e.g., outdoors, inside office buildings, warehouses, arenas, hospitals, hangars, homes, caves, mines, bunkers, tunnels, etc.), many of which are not suitable for GPS navigation techniques. For many commercial and industrial applications and environments, the navigation techniques provided by the system 100 may be readily deployed without requiring purpose-built infrastructure, thereby reducing the cost to deploy the system 100 and enabling commercial and industrial entities to adopt UAVs for desired applications more quickly. Additionally, the system 100 provides a decentralized solution to UAV navigation whereby operation of the UAV 140 is not dependent on any central site or node. Thus, the system 100 provides an improvement in the field of UAV navigation and improves the navigation and operation of the UAV 140 itself.

Figure 2:
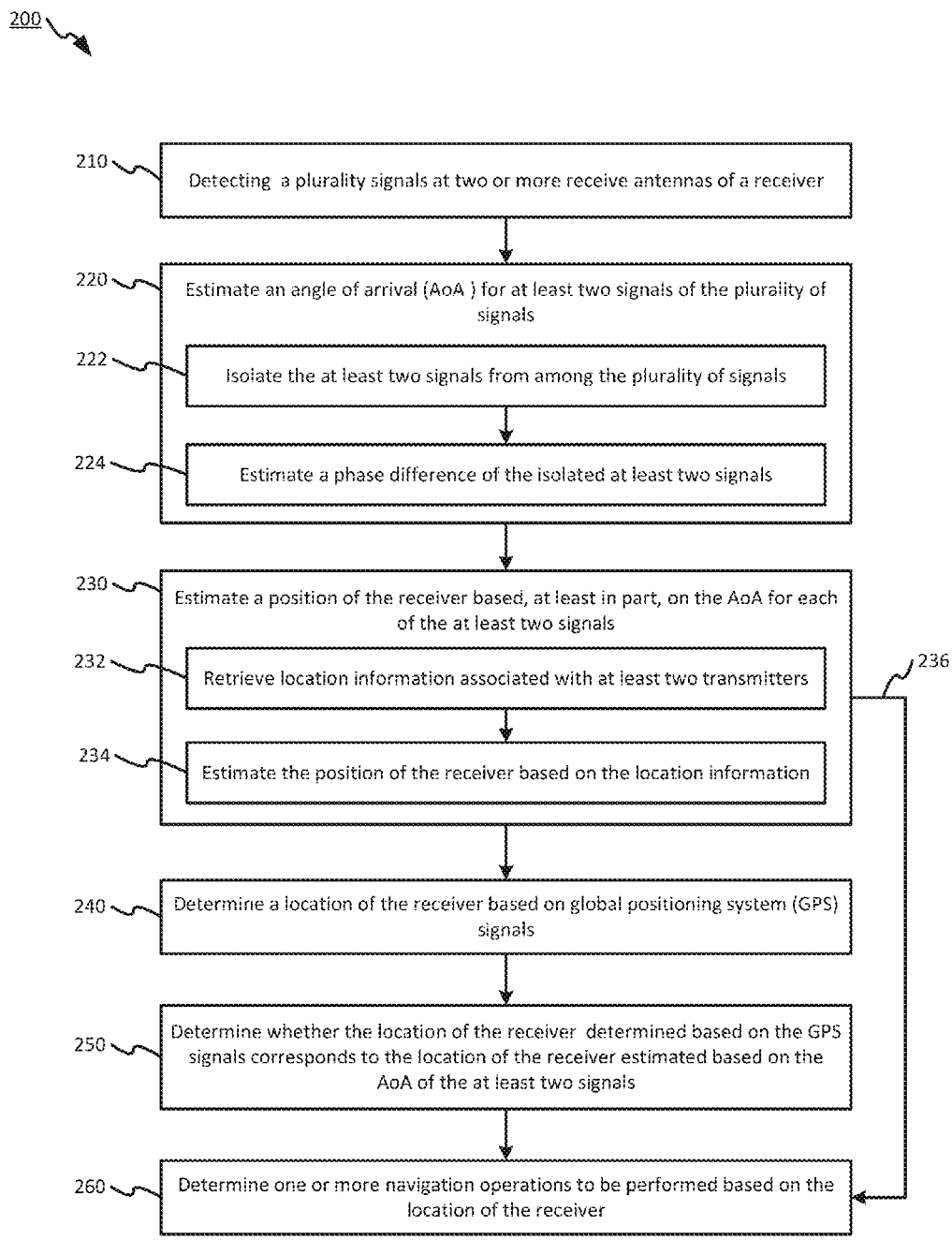
FIG. 2 is a flow chart illustrating an embodiment of determining a location of a UAV using signals of opportunity.

Referring to FIG. 2, a flow chart illustrating an embodiment of determining a location of a UAV using signals of opportunity is shown as a method 200. In an embodiment, the method 200 may be performed by the UAV 140 (e.g., by the processor 142 and/or a processor of the receiver 146 and/or a processor of the PAC system 144). At 210, the method 200 includes detecting a plurality of signals at two or more receive antennas of receiver. In an embodiment, the receiver may be the receiver 146 of FIG. 1, and the plurality of signals may be the wireless signals 112, 122, 132 of FIG. 1. In an embodiment, the plurality of signals may be a plurality of FM radio signals broadcast from different FM radio transmitters.

At 220, the method 200 includes estimating an angle of arrival (AoA) for at least two signals of the plurality of signals. In an embodiment, the AoA for each of the at least two signals may be determined as described with reference to one or more of FIGS. 5A-5C. In an additional or alternative embodiment, the AoA for each of the at least two signals may be a differential AoA (dAoA), and may be determined as described with reference to one or more of FIGS. 7A-7E. In an embodiment, the method 200 may include, at 222, isolating the at least two signals from among the plurality of signals prior to determining the AoA. In an embodiment, isolating the signals may be performed as described with reference to one or more of FIGS. 3 and 4. In an embodiment, the method 200 may include, at 224, estimating a phase difference of the at least two isolated signals. In an embodiment, the phase difference of the at least two isolated signals may be determined as described with reference to one or more of FIGS. 3 and 5A-5C.

At 230, the method 200 includes estimating a position of the receiver based, at least in part, on the AoA for each of the at least two signals. In an embodiment, the location of the receiver may be determined based on the AoA for each of the at least two signals as described with reference to one or more of FIGS. 6A-8C. In an embodiment, the method 200 includes, at 232, retrieving location information associated with at least two transmitters (e.g., the transmitters transmitting the at least two signals). In an embodiment, the location information may be stored at a database, such as the database 150 of FIG. 1. In an embodiment, the method 200 includes, at 234, estimating the position of the receiver based on the location information. In an embodiment, the position of the receiver may be estimated based on the location information associated with the at least two transmitters as described with reference to one or more of FIGS. 5A-8C.

In an embodiment, the method 200 includes, at 240, determining a location of the receiver based on global positioning system (GPS) signals, and, at 250, determining whether the location of the receiver determined based on the GPS signals corresponds to the location of the receiver estimated based on the AoA of the at least two signals. In an embodiment, when the locations do not satisfy a threshold (e.g., are not within a threshold distance of each other), a UAV that includes the receiver may determine that the GPS signal is not suitable for use in navigation, and may initiate operations to navigate using only the locations of the receiver estimated based on the AoA of the at least two signals. In an embodiment, the method 200 may not include steps 240 and 250, as indicated by the arrow 236.

At 260, the method 200 includes determining one or more navigation operations to be performed based on the location of the receiver. In an embodiment, the one or more navigation operations may include a steering operation to change a direction of travel of a UAV that includes the receiver. In an additional or alternative embodiment, the one or more navigation operations may include a speed control operation to modify a speed (e.g., accelerate or decelerate) at which the UAV that includes the receiver is travelling. It is noted that other navigation operations may be determined and used in conjunction with step 260 and the exemplary navigation operations described above are provided by way of illustration, rather than by way of limitation.

The method 200 provides an improved navigation technique for UAVs that may enable UAV deployments in a diverse number of environments (e.g., outdoors, inside office buildings, warehouses, arenas, hospitals, hangars, homes, caves, mines, bunkers, tunnels, etc.), many of which are not suitable for GPS navigation techniques. For many commercial and industrial applications and environments, the navigation techniques provided by the method 200 may be readily deployed without requiring purpose-built infrastructure, thereby reducing the cost to deploy UAVs operable to perform the method 200. This may enable commercial and industrial entities to adopt UAVs for desired applications more quickly. Additionally, the method 200 provides a decentralized solution to UAV navigation whereby operation of the UAV 140 is not dependent on any central site or node. Thus, the method 200 provides an improvement in the field of UAV navigation and improves the navigation and operation of the UAV itself.

FIGS. 9A-9K illustrate various simulation results of a system configured according to embodiments of the system 100. During the simulation, a receiver including spatially separated antennas configured to receive FM band radio signals (e.g., 88 MHz-108 MHz) from spatially separated transmitters was used. The received signals had a 200 kHz separation between channels, and the received signals were be spectrally isolated using fast Fourier transform (FFT) techniques. A phase difference between two received signals (e.g., one signal at each receive antenna) for each isolated signal was used to derive the angles of arrival (AoAs) for each received signal, and the AoAs were leveraged to estimate the position of the receiver.

The accuracy of the position estimation of the receiver depends on the accuracy of the measured AoA, where the accuracy of the AoA is a function of number of samples for FFT length ($N_{samples}$), a signal-to-noise ratio (SNR) at the receiver, and a baseline separation (d) between the antenna elements of the receiver, and the true AoA. The FM band radio signals spread for 20 MHz (88 MHz-108 MHz) with 200 kHz separation between channels. The analog radio signals were down-converted to a baseband signal and then be digitized. Thereafter, the maximum frequency component was assumed to be 20 MHz at 200 kHz frequency resolution. The FFT length was given by:

$$\Delta f = \frac{f_s}{N_{samples}}.$$ Equation 14

In equation 14, where $\Delta f$ is the frequency resolution, $f_s$ is the sampling frequency, and $N_{samples}$ is the FFT length. According to the Nyquist theorem, the sampling frequency must be at least twice the maximum signal frequency to retrieve the original signal. Therefore, $f_s$ must be at least 40 MHz. The $f_s$ was assumed to be 50 MHz during the simulations. Then the $N_{samples}$ was calculated to be 250. During the simulation, the FFT length was chosen to be 256 (e.g., closest power of 2).

Figure 9A:
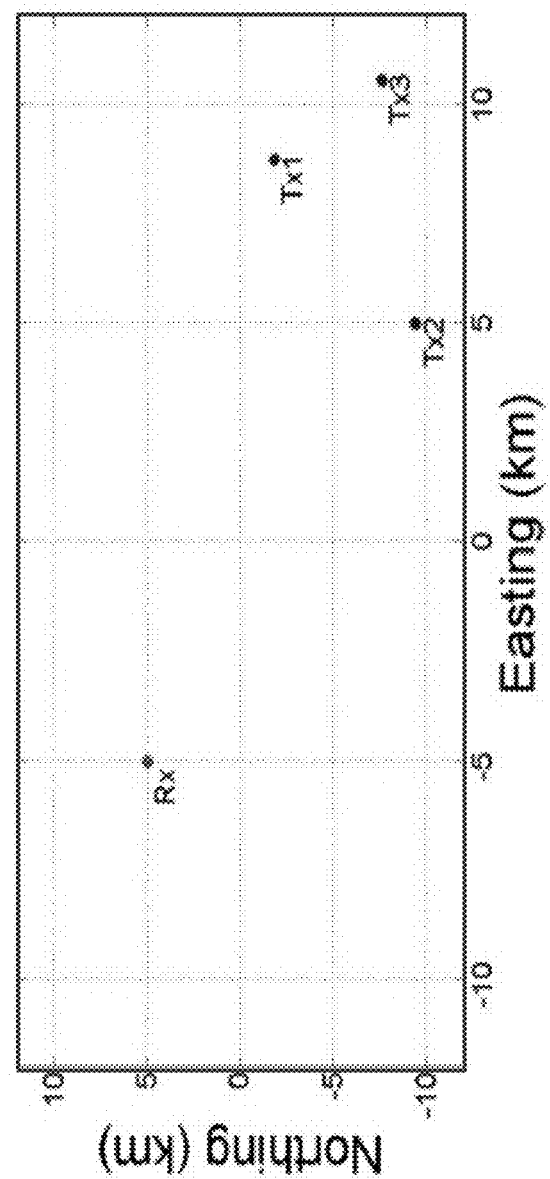
FIG. 9A illustrates relative positions of a receiver and transmitters during a simulation.

FIG. 9A illustrates the relative positions of the receiver and the transmitters during the simulation. Based on the range between the receiver and the transmitters, the SNR and true AoA were calculated. The receiver baseline separation between the antenna elements (d) was $\lambda/2$, and $N_{samples}$ was chosen to be 256. The transmitted power (PTx) and Noise Figure (NF) of the receiver are chosen to be 50 dBW and 8 dB, respectively. The standard deviation of the AoA ($\sigma_{AoA}$) was then calculated according to:

$$\sigma_{AoA} = \frac{53.256 \exp(-0.02746 x')}{\left(\sqrt{N_{samples}}\right)\left(\frac{d}{\lambda}\right)\left(\sqrt{SNR(\text{linear})}\right)}.$$ Equation 15

A Gaussian random sequence of AoAi with the length of 1000 samples and a standard deviation $\sigma_i$ was then generated as AoA for the signal received from the i-th transmitter. The AoAs are then exploited to find the position of the receiver according to:

$$\epsilon_k = \sqrt{(x_k - x_t)^2 + (y_k - y_t)^2}, \text{ for } k=1,2,\ldots,1000.$$ Equation 16

In equation 16, $(x_k, y_k)$ are the position estimations from the k-th sample of AoA (e.g., $AoA_k$), and $(x_1, y_1)$ is the true position of the receiver, and $\epsilon_k$ is the error in the position estimation for the k-th sample $AoA_k$.

Figure 9B:
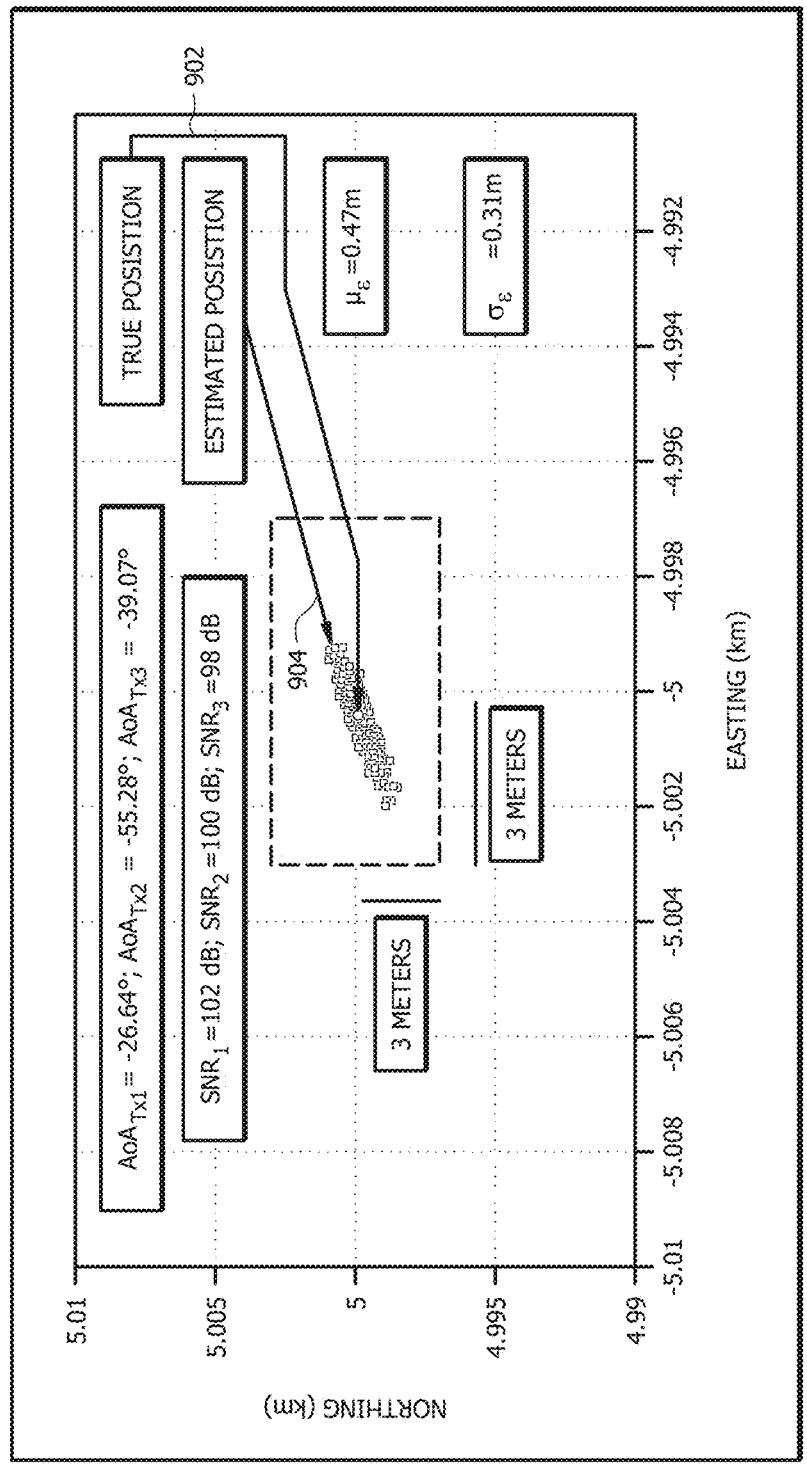
FIG. 9B illustrates a plot of position determinations derived during the simulation.

FIG. 9B illustrates a plot of position determinations derived during the simulation according to equation 16. From FIG. 9B it can be seen that the proposed technique provides position estimation accuracy with a bias ($\mu_\epsilon$) of 0.47 meters (m), and standard deviation ($\sigma_\epsilon$) of 0.31 m. In FIG. 9B, the true position of the receiver (e.g., $(x_1, y_1)$) is indicated by the arrow 902, and the estimated positions of the receiver are indicated by the arrow 904. It is noted that, during the simulation, the accuracy of the position estimation was subject to the efficiency of the transmitters selected, and that optimization of the selected transmitters was not considered.

Figure 9C:
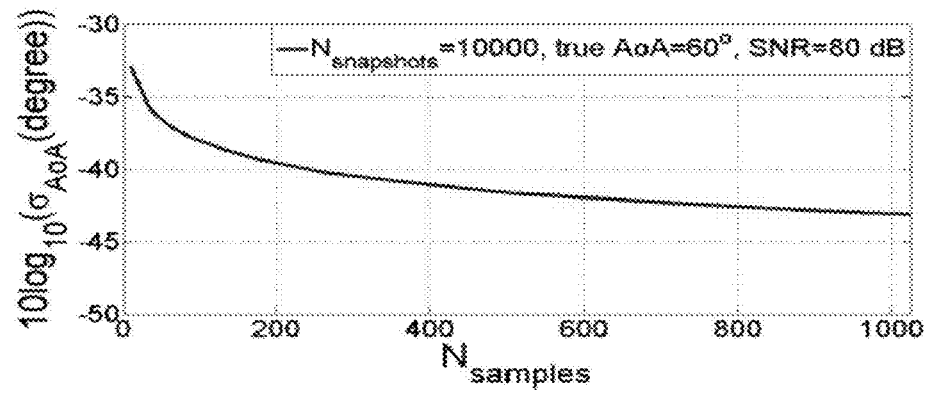
FIG. 9C illustrates the estimated AoA accuracy as a function of the number of samples in an FFT.
Figure 9D:
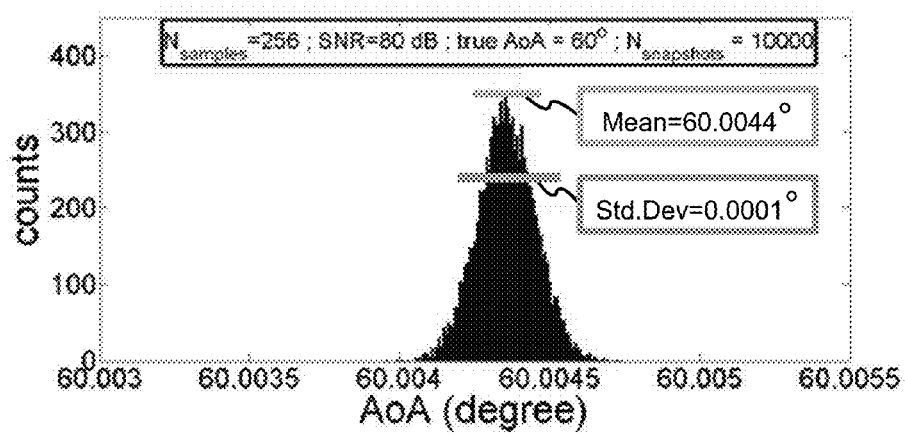
FIG. 9D illustrates the probability density of the AoA for $N_{samples}$ equal to 256.

FIG. 9C illustrates the estimated accuracy of the AoA as a function of the number of samples in the FFT (e.g., $N_{samples}$). As illustrated in FIG. 9C, the AoA error fluctuates between -1 dB and +1 dB after the $N_{samples}$ are increased beyond 256. FIG. 9D illustrates the probability density of the AoA for $N_{samples}$ equal to 256. It can be seen in FIG. 9D that the AoA varies by a small amount of 0.0044° at fixed values of SNR=80 dB, $N_{snapshots}$=10,000 and true AoA=60°. Additionally, the distribution exhibits a standard deviation (sAoA) of 0.0001°. Thus, the measured data is predicted or expected to be within 0.0001° approximately 68% of the time.

Figure 9E:
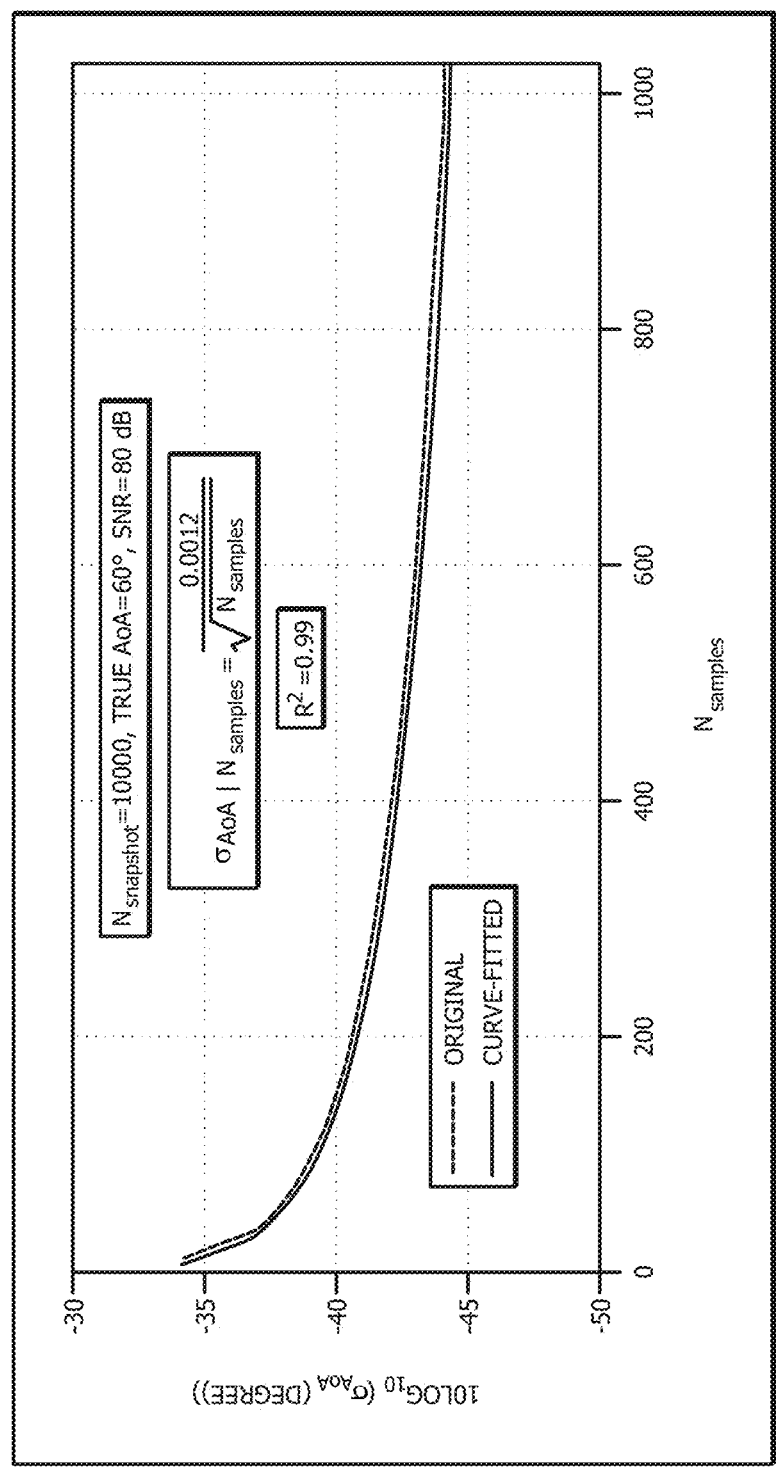
FIG. 9E illustrates a curve-fitting approach adopted to predict the effect of $N_{samples}$ over $\sigma_{AoA}$.

FIG. 9E illustrates a curve-fitting approach adopted to predict the effect of $N_{samples}$ over $\sigma_{AoA}$. The accuracy of AoA for different values of $N_{samples}$ is inversely proportional to the square root of $N_{samples}$, and may be given by:

$$\sigma_{AoA} / N_{samples} = \frac{p}{\sqrt{N_{samples}}},$$ Equation 17 where p is scalar.

In FIG. 9E, the coefficient determination is denoted as $R^2$, and indicates how well a set of data fits into a statistical model. In FIG. 9E, $R^2$ was determined according to:

$$R^2 = 1 - \frac{SS_{res}}{SS_{tot}},$$ Equation 18 where $SS_{res}$ is the sum of squares of the residuals and $SS_{tot}$ is the total sum of squares.

Assume that a data set has observed values $y_i$ and predicted values $f_i$. If the mean of the observed values is $\bar{y}$, then $SS_{res}$ may be given by:

$$SS_{res} = \Sigma_i (y_i - f_i)^2; \text{ and}$$ Equation 19

$SS_{tot}$ may be given by:

$$SS_{tot} = \Sigma_i (y_i - \bar{y})^2.$$ Equation 20

Figure 9F:
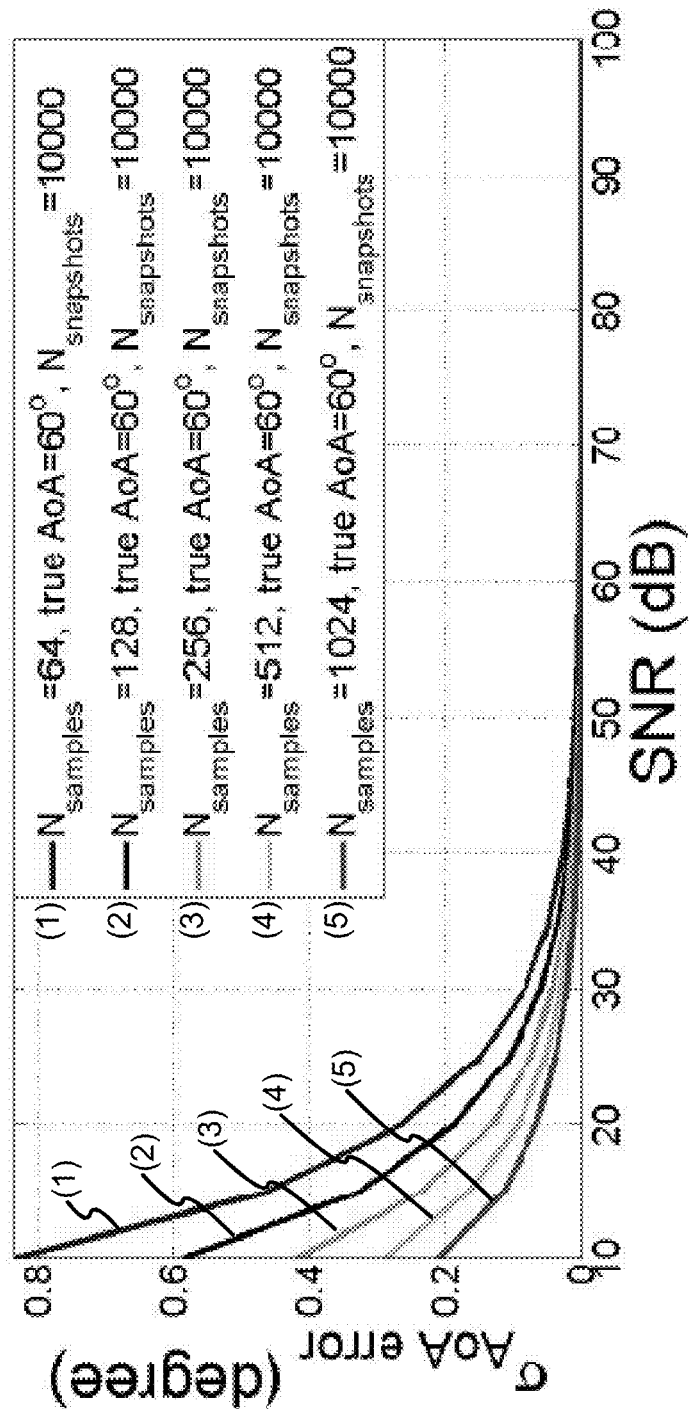
FIG. 9F illustrates the effect of SNR on the accuracy of the AoA.

FIG. 9F illustrates the effect of SNR on the accuracy of the AoA. As can be seen in FIG. 9F, the accuracy of the AoA (e.g., $\sigma_{AoA}$) increases with the increased value of SNR, but the change in AoA becomes negligible after SNR values of higher than 40 dB. A curve-fitting approach was used to find a closed-form relationship between SNR and $\sigma_{AoA}$ given by:

$$\sigma_{AoA} | SNR = \frac{p}{\sqrt{SNR(\text{linear})}},$$ Equation 21 where p is scalar.

Figure 9G:
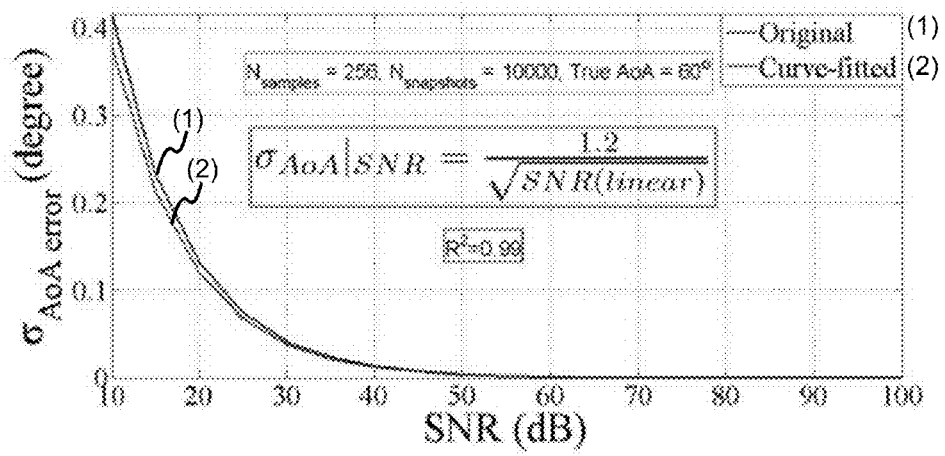
FIG. 9G is a plot illustrating predicted values for $\sigma_{AoA}$ for different SNR values.

Thus the accuracy of the AoA is inversely proportional to the square root of SNR in linear format. FIG. 9G is a plot illustrating predicted values for $\sigma_{AoA}$ of equation 21 for different SNR values, for fixed values of $N_{snapshots}$=10,000, $N_{samples}$=256, and true AoA=60°. The $R^2$ value for equation 21 was calculated to be greater than 0.9.

Figure 9H:
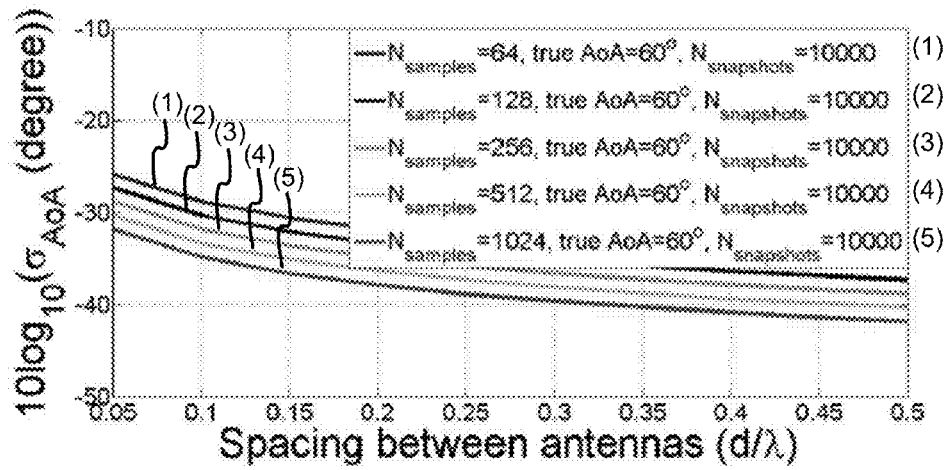
FIG. 9H is a plot that illustrates how AoA accuracy improves when a receiver baseline (d) between spatially separated antennas close to $\lambda/2$.

FIG. 9H is a plot that illustrates the measured AoA becomes stable when a receiver baseline (d) between spatially separated antennas close to $\lambda/2$. A curve-fitting approach was used to develop a closed-form relationship between AoA accuracy and baseline distance (d) and is given by:

$$\sigma_{AoA} | d = \frac{p}{d},$$ Equation 22 where p is scalar, and d is the receiver base line length or distance between receive antennas (m).

Figure 9I:
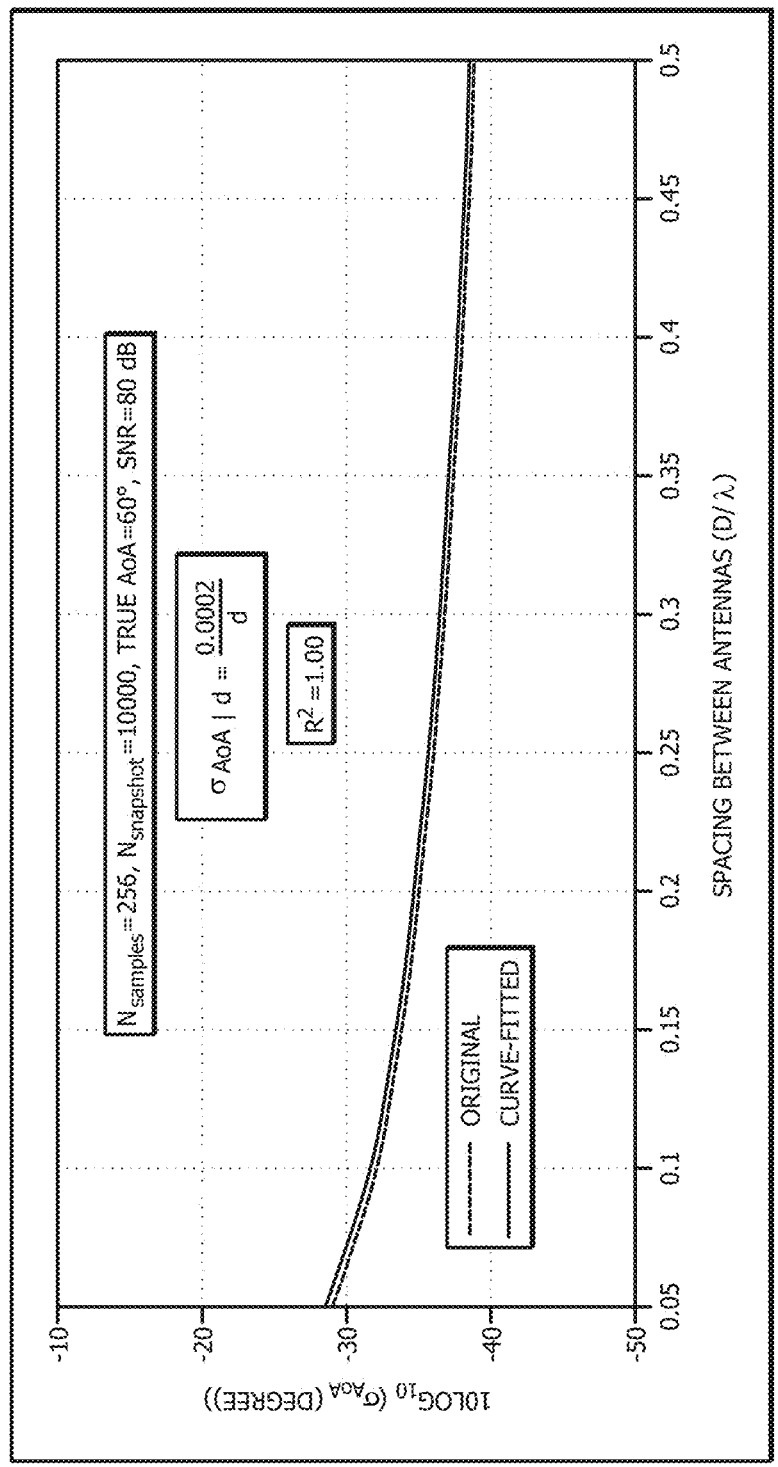
FIG. 9I is a plot illustrating predicted values for $\sigma_{AoA}$ for different receiver baseline values.

Thus, the AoA accuracy is inversely proportional to the receiver baseline distance between receive antennas. The $R^2$ value for equation 21 was calculated to be greater than 0.9. FIG. 9I is a plot illustrating predicted values for $\sigma_{AoA}$ of equation 21 for different SNR values, for fixed values of $N_{snapshots}$=10,000, $N_{samples}$=256, and true AoA=60°.

Figure 9J:
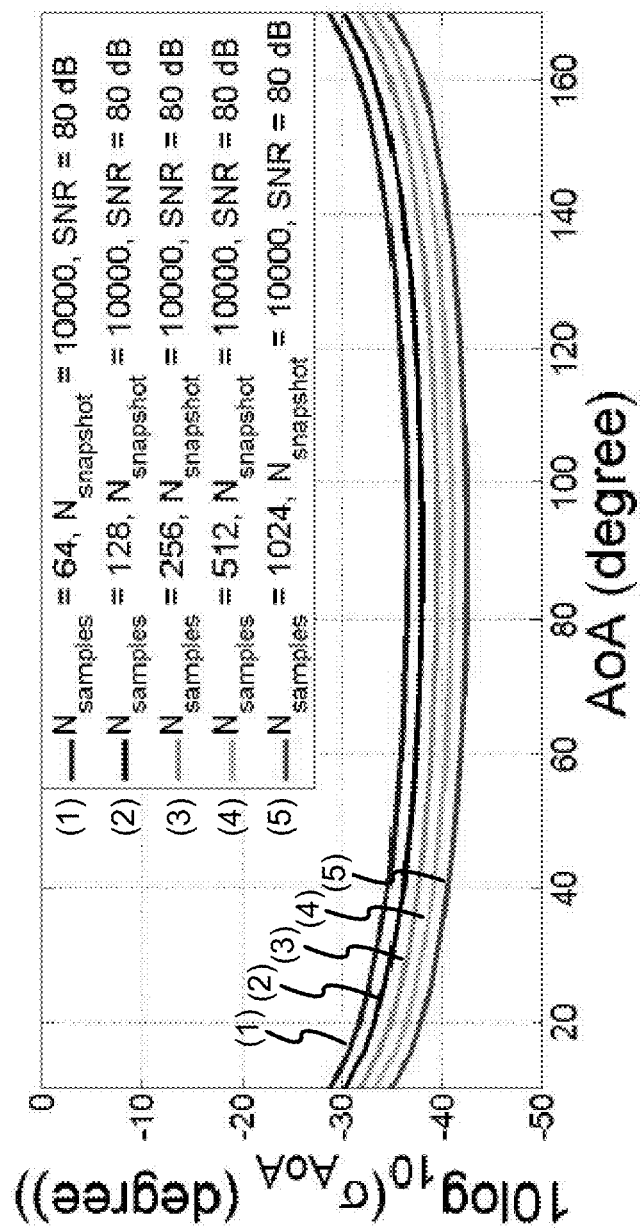
FIG. 9J is a plot illustrating a parametric study of $\sigma_{AoA}$ vs. true AoA for different values of $N_{samples}$ equal to 256.

FIG. 9J is a plot illustrating a parametric study of $\sigma_{AoA}$ vs. true AoA for different values of $N_{samples}$. As shown in FIG.

Figure 9K:
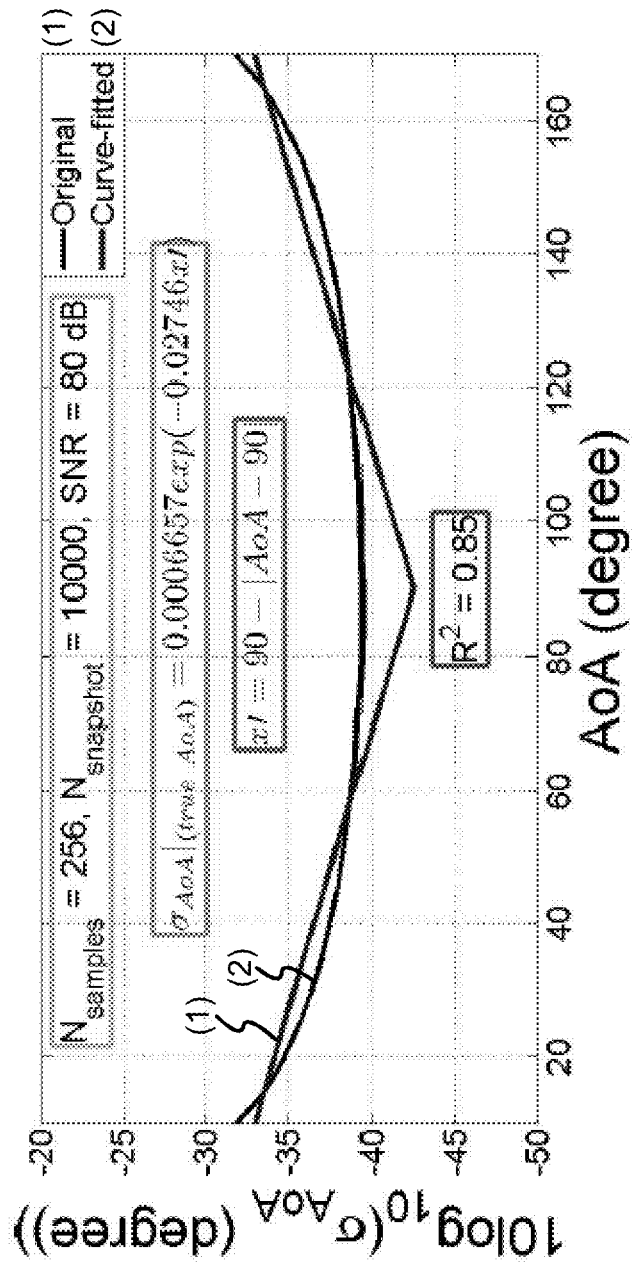
FIG. 9K is a plot illustrating a curve-fitting approach used to find a closed-form relationship between $\sigma_{AoA}$ and true AoA for $N_{samples}$.

9J, the $\sigma_{AoA}$ may exhibit low accuracy for AoA values between 0 to 10 degrees. Therefore, in an embodiment, the navigation system may utilize transmitter positions that are between 10 to 170 degrees. FIG. 9K is a plot illustrating a curve-fitting approach used to find a closed-form relationship between $\sigma_{AoA}$ and true AoA for $N_{samples}$=256, $N_{snapshots}$=10,000, and true SNR=80 dB. The data points plotted in FIG. 9K were derived according to:

$$\sigma_{AoA}|\text{trueAoA}=c_1 \exp(c_2 x'), \text{ where } c_1 \text{ and } c_2 \text{ are scalars.} \quad \text{Equation 23}$$

In equation 23, and x' may be represented by:

$$x'=90-|\text{AoA}-90|. \quad \text{Equation 24}$$

Thus, FIGS. 9A-9K, illustrate various relationships between the effect of $N_{samples}$, SNR, receiver baseline distance (d) between receive antennas, and true AoA on the $\sigma_{AoA}$ have been shown. Additionally, the closed-form relationships between the parameters and $\sigma_{AoA}$ have been established. The simulation results indicate that the navigation technique of embodiments are predicted to have $\sigma_{AoA}$ with an $R^2$ value greater than 0.85 for a range of parameters (listed below), where $\sigma_{AoA}$ is given by:

$$\sigma_{AoA} = \frac{53.256\exp(-0.02746x')}{\left(\sqrt{N_{samples}}\right)\left(\frac{d}{\lambda}\right)\left(\sqrt{SNR(\text{linear})}\right)}, \quad \text{Equation 25}$$

for the following parameter values:

TABLE 1

| Parameters | Range of Values |
| --- | --- |
| $N_{samples}$ | 64:1024 |
| SNR | 30 dB:150 dB |
| Receiver Baseline (d) | $\frac{\lambda}{20}:\frac{\lambda}{2}$ |
| True AoA | 10°:170° |

Figure 10:
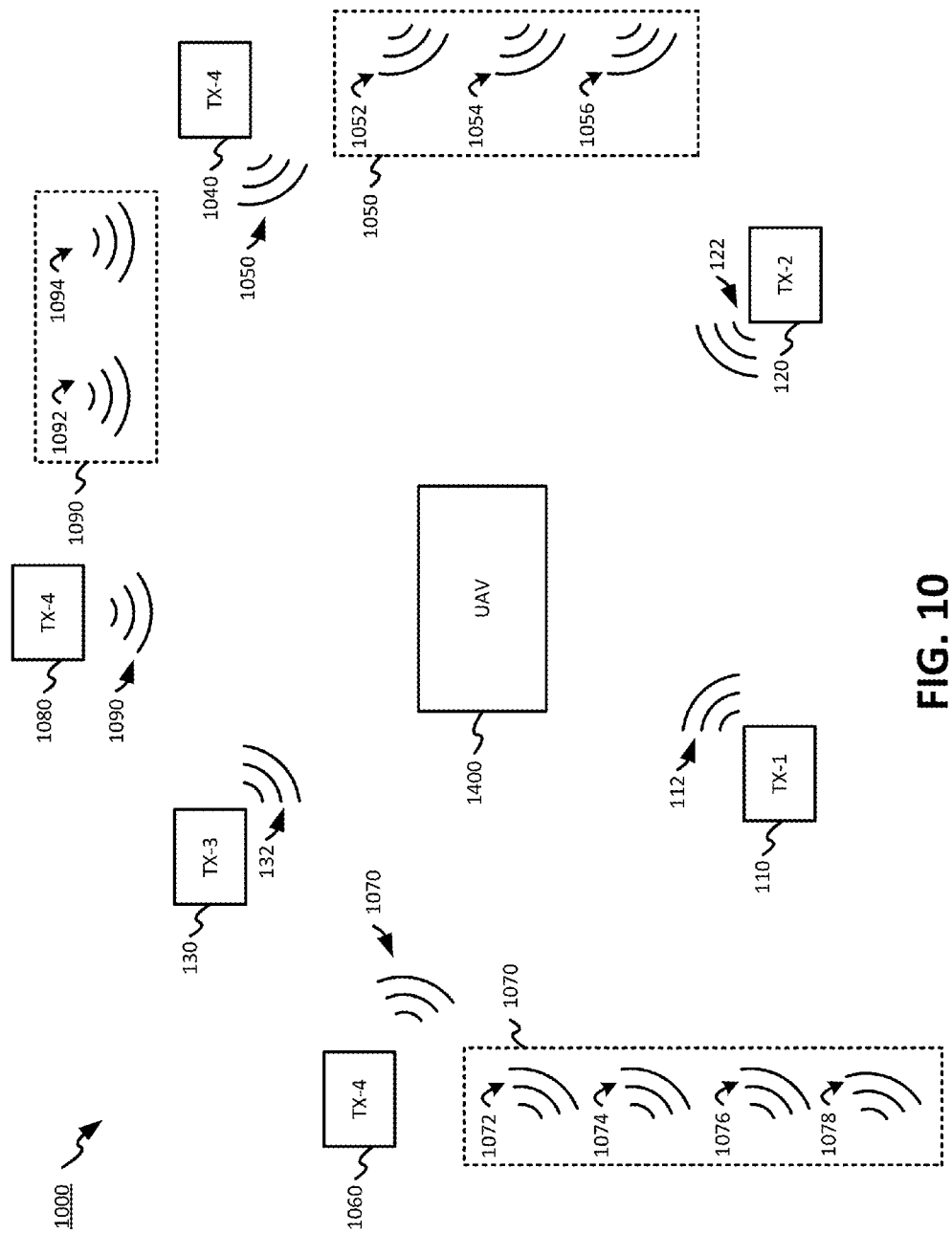
FIG. 10 is a block diagram of a system for facilitating navigation of a UAV using signals transmitted by ground-based transmitters that include at least one supertower.

Referring to FIG. 10, a block diagram illustrating an embodiment of a system for facilitating navigation of a UAV using signals transmitted by ground-based transmitters (G-B TXs) that include at least one supertower is shown as a system 1000. As shown in FIG. 10, the system 1000 includes a UAV 1400. In an embodiment, the UAV 1400 may be configured in the same manner as the UAV 140 of FIG. 1. For example, in FIG. 10 a plurality of G-B TXs is shown, and includes the first G-B TX 110, the second G-B TX 120, and the third G-B TX 130 of FIG. 1. The UAV 1400 of FIG. 10 may be configured to utilize navigation techniques that leverage wireless transmissions, such as the wireless signals 112, 122, 132, transmitted from the G-B TXs 110, 120, 130 to make position determinations when navigating from a point of origin to a destination, as described with reference to FIGS. 1-9K.

In the embodiment illustrated in FIG. 10, the UAV 1400 may be further configured to leverage transmissions from supertowers to improve the accuracy of position determinations made during navigation from the point of origin to the destination. A supertower may be a single G-B TX that transmits two or more distinct wireless signals. In an embodiment, a supertower may be a single FM radio transmission tower that transmits two or more distinct FM radio signals (e.g., FM radio signals transmitted at different frequencies). In an additional or alternative embodiment, a supertower may be a wireless access point or other wireless transmitter that transmits two or more signals that are capable of being distinguished from each other, such as a wireless access point that transmits wireless signals using multiple SSIDs. This may be useful for deployments of the UAV 1400 in an indoor environment, such as in a warehouse, a mall, etc.

As shown in FIG. 10, the plurality of G-B TXs includes a first supertower 1040, a second supertower 1060, and a third supertower 1080. Each of the super towers 1040, 1060, 1080 may be configured transmit two or more distinct wireless signals. For example, the first supertower 1040 may transmit a first plurality of signals 1050 that includes wireless signals 1052, 1054, and 1056, the second supertower 1040 may transmit a second plurality of signals 1070 that includes wireless signals 1072, 1074, 1076, and 1078, and the third supertower 1080 may transmit a third plurality of signals 1090 that includes wireless signals 1092 and 1094. Each of the wireless signals 112, 122, 132, 1052, 1054, 1056, 1072, 1074, 1076, 1078, 1092, and 1094 may be distinct relative to each other. It is noted that although FIG. 10 illustrates supertowers as transmitting between 2-4 distinct wireless signals, embodiments of the present disclosure contemplate implementations where supertowers may transmit more than 4 distinct wireless signals.

During navigation, the UAV 1400 may be configured to leverage some of the wireless signals 112, 122, 132, 1052, 1054, 1056, 1072, 1074, 1076, 1078, 1092, and 1094 broadcast from the plurality of G-B TXs 110, 120, 130, 140, 1060, 1080, respectively, to approximate a current location of the UAV 1400, thereby enabling the UAV 1400 to navigate from the point of origin to the destination. The UAV 1400 may approximate its current location based, at least in part, on a characteristic of the received wireless signals, as described with reference to FIGS. 1-9K. For example, in an embodiment, the UAV 1400 may determine a phase difference and an angle of arrival (AoA) for some of the wireless signals 112, 122, 132, 1052, 1054, 1056, 1072, 1074, 1076, 1078, 1092, and 1094, and may determine a position estimate for the UAV 1400, as described with reference to FIGS. 1-9K. Because the signals transmitted by the supertowers 1040, 1060, 1080 originate from a single location (e.g., one of the supertowers 1040, 1060, 1080), the AoA for each of the signals 1052, 1054, 1056 should be the same, which may increase to accuracy of a position determination made using signals received from at least one of the supertowers 1040, 1060, 1080, as described in more detail below.

Figure 11:
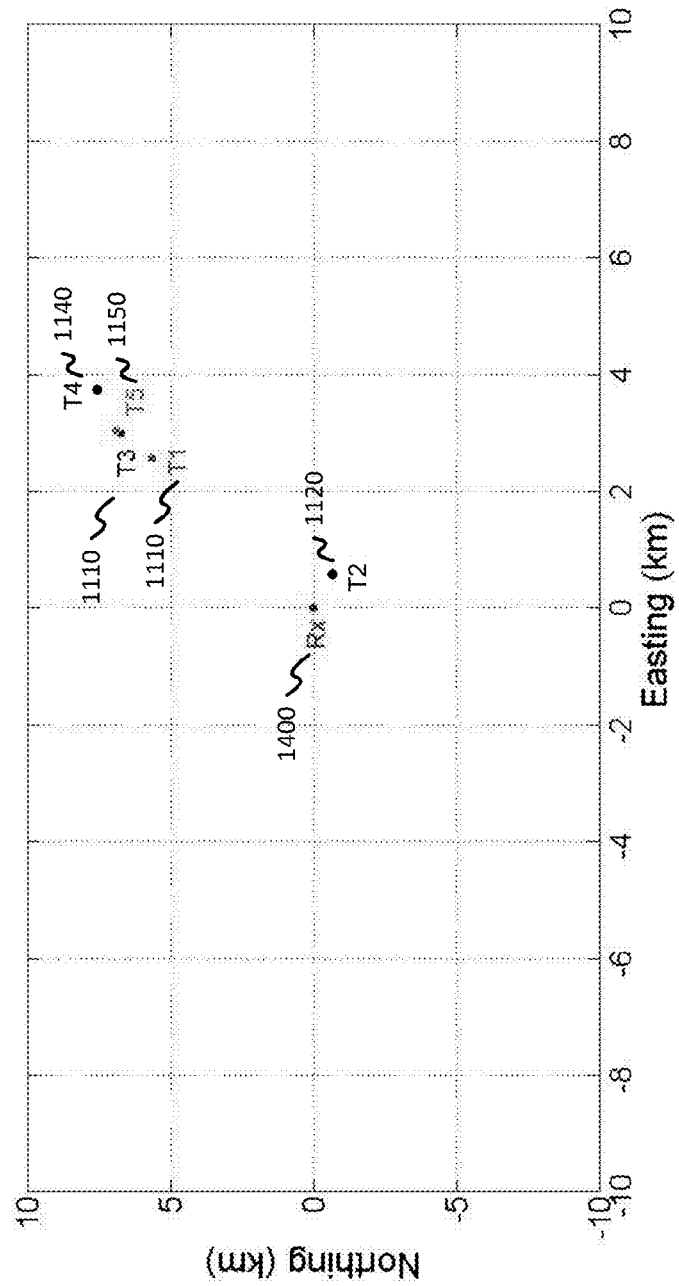
FIG. 11 is a diagram illustrating a plurality of ground-based transmitters (G-B TXs) with known positions and a receiver with an unknown position.

Referring to FIG. 11, a diagram illustrating a plurality of ground-based transmitters (G-B TXs) with known positions and a receiver with an unknown position is shown. As shown in FIG. 11, the diagram includes the receiver 1400 of FIG. 10, and a plurality of G-B TXs. The plurality of G-B TXs includes a first G-B TX 1110, a second G-B TX 1150, and supertowers 1120, 1130, 1140. Each of the plurality of G-B TXs depicted in FIG. 11 corresponds to an actual FM radio transmission tower, which were used to conduct a simulation of a receiver, such as the receiver of the UAV 1400 of FIG. 10, for use in determining a position of a UAV using signals received from at least one supertower. The transmission frequencies for each of the G-B TXs is shown in the table below.

TABLE 2

| G-B TX | Transmit Frequency (MHz) | | | |
|---|---|---|---|---|
| 1110 | 88.5 | — | — | — |
| 1120 | 93.3 | 103.3 | 94.1 | — |
| 1130 | 89.3 | 104.3 | — | — |
| 1140 | 94.9 | 102.1 | 105.1 | 97.3 |
| 1150 | 90.1 | — | — | — |

During the simulation, AoAs were calculated based on the phase difference of the signals received from the plurality of G-B TXs, as described above with reference to FIGS. 1-9K. In an additional or alternative embodiment, the phase difference may be calculated using an accurate signal as a reference signal that is compared to the signal(s) received from one of the plurality of G-B TXs, and the phase difference between the reference signal and the received signal may then be used to calculate the AoA(s). The simulations were performed using a sampling rate of approximately 20.48 MHz, an FFT size of 2048, and a frequency resolution of 10 kHz. The FFT provided 20 frequency bins for each of the signals. The 20 frequency bins resulted from the fact that the FM channel bandwidth is 200 kHz and the frequency resolution was chosen to be 10 kHz. During the simulations, the phase information was extracted from the frequency bin with highest SNR for each signal, as explained in more detail below with reference to FIGS. 12A-12C.

During the simulations, the measured phase differences and the calibrated AoAs were utilized in different ways to estimate position of the UAV 1400's receiver. In a first embodiment, the phase difference from 1000 snapshots were transformed into 1000 AoA measurements, and the 1000 AoA measurements were translated to 1000 position estimates. The position estimate for the UAV 1400's receiver was then determined as the mean of the 1000 position estimates. The error between the measured and true position of the UAV 1400's receiver was denoted by $\epsilon_{\mu\_pos}$. In a second embodiment, 1000 AoAs were calculated from 1000 phase difference measurement results and then the mean of the 1000 AoAs was calculated. The mean value of the AoAs was then used to determine the position estimate for the UAV 1400's receiver. The error between the measured position estimate and the true position was denoted by $\epsilon_{\mu\_dAoA}$. In a third embodiment, the mean of the 1000 phase difference measurements was calculated first and then the mean value of the phase difference measurements was used to calculate a single value for the AoA as well as a single value for position estimate for the UAV 1400's receiver. The resultant error was denoted as $\epsilon_{\mu\_\Delta\varphi}$. Two trials were performed to validate the measured results, where a single trial consists of 1000 snapshots and (1000×2048) sample data for the received signals. A comparison of the errors derived from the three different embodiments described above is shown in the table below.

TABLE 3

| Embodiment | $\epsilon_{position\_estimate}$ (Trial 1) | $\epsilon_{position\_estimate}$ (Trial 2) |
|---|---|---|
| $\epsilon_{\mu\_pos}$ | 27.63 m | 28.2 m |
| $\epsilon_{\mu\_dAoA}$ | 26.14 m | 27.73 m |
| $\epsilon_{\mu\_\Delta\varphi}$ | 22.33 m | 24.51 m |

It is evident from Table 3 that the least error occurred when the mean of the measured phase differences was used for position estimate. Thus, averaging of the phase differences may reduce the impact of outliers in the first stage of the measurement calculation.

In an embodiment, the accuracy of the position estimate may be further improved by filtering the measured phase differences. The standard deviation (a) of the 1000 measured phase differences was calculated and the measured values that were outside a were discarded. The mean of the measured phase difference may then be used to calculate the AoA and the position estimate. The error between position estimates for before and after filtering are shown in the table below.

TABLE 4

| $\epsilon_{\mu\_\Delta\varphi}$ | $\epsilon_{position\_estimate}$ (Trial 1) | $\epsilon_{position\_estimate}$ (Trial 2) |
|---|---|---|
| Before filtering | 22.33 m | 24.51 m |
| After filtering | 16.4 m | 19.75 m |

In the measurements described above with respect to Tables 3 and 4, the AoA was calculated from the phase difference extracted from the frequency bin with highest SNR. However, in some embodiments the frequency bin with highest SNR does not ensure the most accurate phase information. According to embodiments of the present disclosure, utilizing supertowers, such as the supertowers 1120, 1130, 1140, may provide more accurate phase information even when frequency bins with the highest SNR are not used to extract the phase information, as described in more detail below.

The accuracy of the phase difference measurement depends on the coherency between the received signals. The measured phase difference is then used to calculate the AoA of the transmitted signals may be represented by:

$$AoA(degree) = \cos^{-1}\left(\frac{\lambda}{2\pi d}\Phi\right). \quad \text{Equation 26}$$

In equation 26, φ is the phase difference between the same signal (e.g., one of the signals 1052, 1054, 1056) as received at the two or more antenna elements of the receiver (in radians), λ is the wavelength in meters at the transmit frequency, and d is the distance separating the two or more antenna elements (e.g., the distance (d) between the antenna elements 302 and 304 of FIG. 3). As explained above, As explained above, because the signals from the supertowers are transmitted from a single location, the AoA for each of the signals should be the same. This relationship may be expressed as:

$$\cos^{-1}\left(\frac{\lambda}{2\pi d}\Phi_{12}\right) = \cos^{-1}\left(\frac{\lambda}{2\pi d}\Phi'_{12}\right), \quad \text{Equation 27}$$

where $\varphi_{12}$ and $\varphi'_{12}$ are the phase differences between the same received signals at two different antenna elements from co-located transmitters (e.g., a supertower) at different frequencies in radians, and d is the distance separating the two or more antenna elements (e.g., the distance (d) between the antenna elements 302 and 304 of FIG. 3). In an embodiment, this algorithm was applied to find the optimum frequency bin from which to extract the phase information for signals transmitted from the supertowers, as described in more detail below with reference to FIGS. 12A-12C.

Figure 12A:
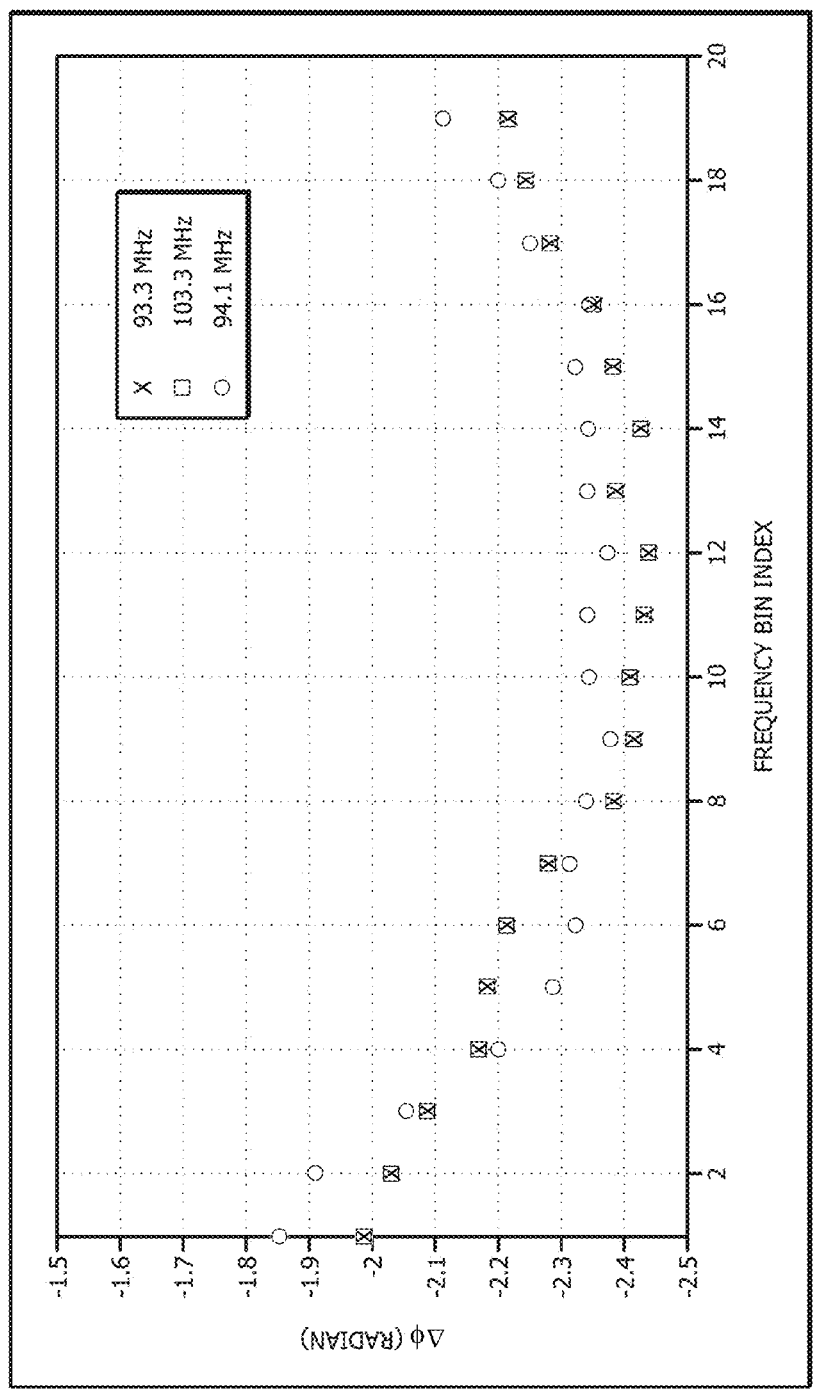
FIG. 12A is a plot of the phase differences for the transmission frequencies of a supertower transmitting three different FM radio signals.
Figure 12B:
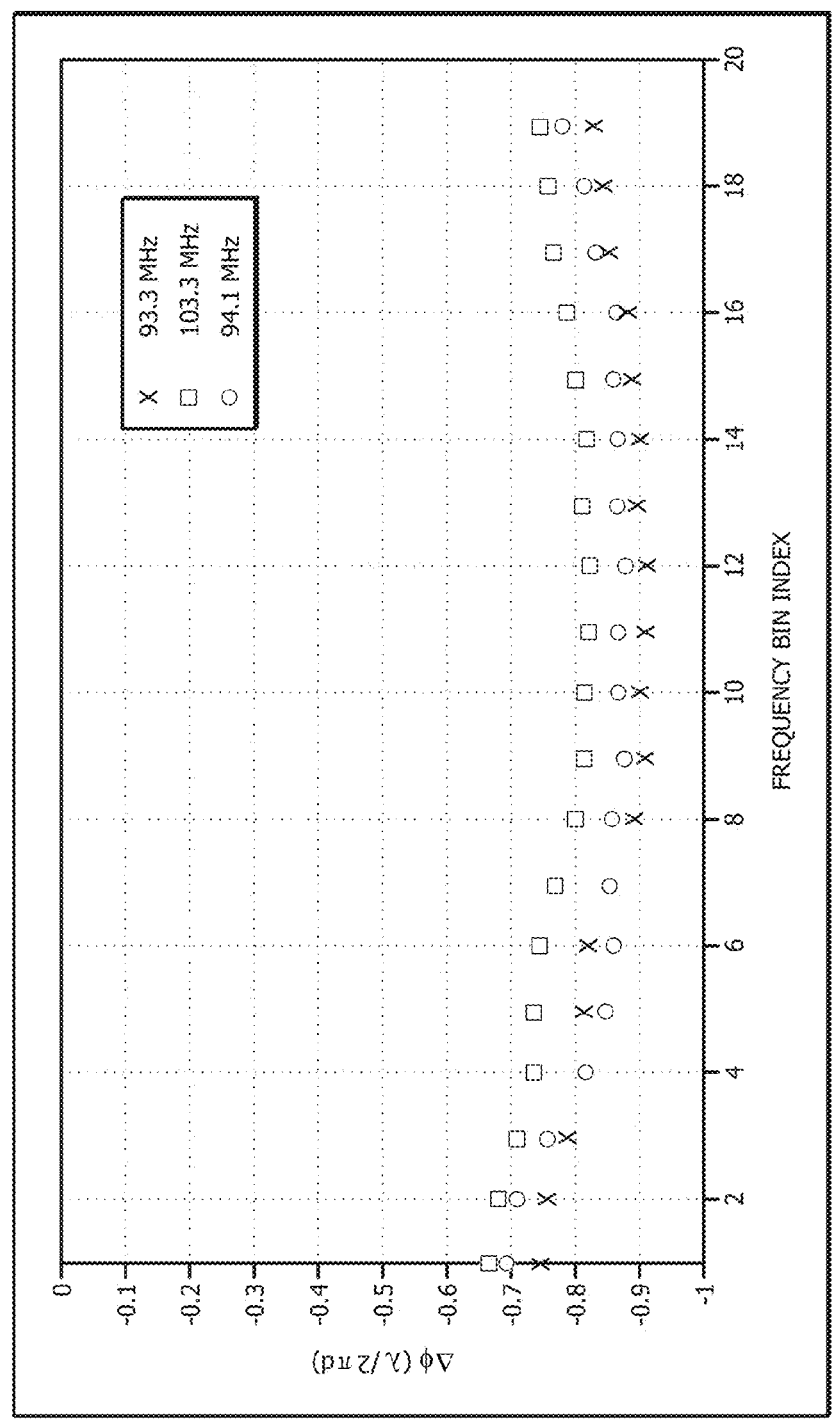
FIG. 12B is a plot illustrating the product of the phase differences of FIG. 12A and $\lambda/2\pi d$ according to embodiments of the present disclosure.
Figure 12C:
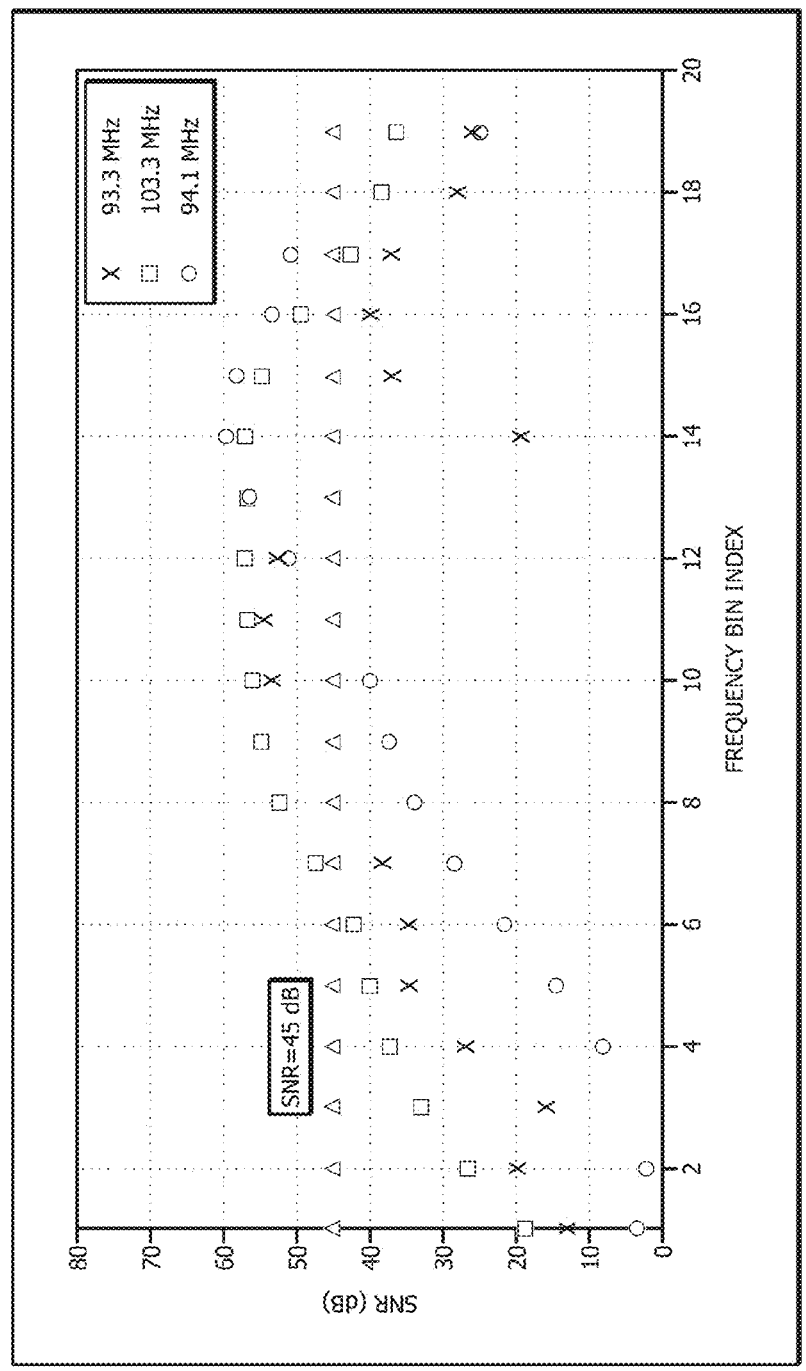
FIG. 12C is a plot illustrating the SNR at each of the frequencies for a supertower.

Referring to FIG. 12A, a plot of the phase differences for the transmission frequencies of a supertower transmitting three different FM radio signals are shown. As explained above, the product of the phase difference and $$\frac{\lambda}{2\pi d}$$

should be equal for all signals transmitted from the same supertower. FIG. 12B is a plot illustrating the product of the phase differences of FIG. 12A and $$\frac{\lambda}{2\pi d}$$

according to embodiments of the present disclosure. During the simulation, the frequency bins that provided SNR<45 dB were excluded from the selection of optimum frequency bins, and the remaining bins for one transmit frequency were compared to the other remaining bins of a second transmit frequency. The bins of the transmit frequencies that were equal or close to each other with 45 dB or higher SNR were then chosen as the optimum bin for that corresponding transmit frequency. FIG. 12C is a plot illustrating the SNR at each of the frequencies for a supertower. In an embodiment, the plots illustrated with respect to FIGS. 12A-12C were generated based on signals received from the supertower 1120 of FIG. 11. Based on the plot illustrated in FIG. 12C, the optimum bins for the supertower 1120 of FIG. 11 were chosen as bins with center frequencies of 93.31 MHz corresponding to the transmit frequency of 93.3 MHz, 103.32 MHz corresponding to the transmit frequency of 103.3 MHz, and 94.15 MHz corresponding to the transmit frequency of 94.1 MHz. The AoAs calculated from the selected frequency bins are illustrated in the table below.

TABLE 5

| TX Frequency | Calculated AoA | Optimum Freq. | Highest SNR Freq. |
|---|---|---|---|
| 93.3 | −28.1378 | 11 | 11 |
| 103.3 | −28.4238 | 12 | 12 |
| 94.1 | −28.4834 | 15 | 14 |

As shown in Table 5 above, the optimum frequency bin selected according to an embodiment of the present disclosure was not the same as the frequency bin with the highest SNR. This may enable the UAV 1400 to obtain a finer accuracy in the AoA calculation. Similar calculations to those illustrated in FIGS. 12A-12C were performed for the supertowers 1130 and 1140 of FIG. 11, and the results of such calculations are reproduced in the tables below, where Table 6 corresponds to the supertower 1130 of FIG. 11, and Table 7 corresponds to the supertower 1140 of FIG. 11.

TABLE 6

| TX Frequency | Calculated AoA | Optimum Freq. | Highest SNR Freq. |
|---|---|---|---|
| 89.3 | 88.3713 | 10 | 11 |
| 104.3 | 88.4106 | 10 | 12 |

TABLE 7

| TX Frequency | Calculated AoA | Optimum Freq. | Highest SNR Freq. |
|---|---|---|---|
| 94.9 | 87.2439 | 14 | 15 |
| 102.1 | 87.1506 | 13 | 11 |
| 105.1 | 86.6302 | 11 | 11 |
| 97.3 | 87.4297 | 12 | 14 |

Referring back to FIG. 11, during the simulation, position estimates were calculated using various combinations of the G-B TXs 1110, 1150 and the supertowers 1120, 1130, 1140, and then the error in each of the position estimates was calculated. The results of the error calculations are summarized in the table below.

TABLE 8

| No. of Supertowers | Index of | Position estimate Error |
|---|---|---|
| 3 | 1120, 1130, 1140 | 12.57 |
| 2 | 1110, 1120, 1130 | 32.55 |
| 2 | 1110, 1120, 1140 | 22.43 |
| 2 | 1110, 1130, 1140 | 46.37 |
| 2 | 1120, 1130, 1150 | 33.43 |
| 2 | 1120, 1140, 1150 | 30.37 |
| 2 | 1130, 1140, 1150 | 48.28 |
| 1 | 1110, 1120, 1150 | 26.35 |
| 1 | 1110, 1130, 1150 | 63.31 |
| 1 | 1110, 1140, 1150 | 30.48 |

From Table 8 it has been shown that the accuracy of the position estimate was the finest (e.g., smallest error in the position estimate) when the position was determined using 3 supertowers. Thus, embodiments utilizing signals received from supertowers to determine the position of the UAV 1400 may provide a more accurate position estimate for use in navigating the UAV 1400. Further, it has been shown that utilizing averaging techniques may further improve the position estimates. As explained above, in a first embodiment utilizing averaging techniques, position estimates may be determined for a plurality of snapshots, and then the position estimates for each snapshot are then averaged to determine the final position estimate. This averaging technique may be expressed as:

$$\text{pos\_est}_i = \sum \frac{\text{pos\_est\_12}_i + \text{pos\_est\_23}_i + \text{pos\_est\_13}_i}{3}. \quad \text{Equation 28}$$

In equation 28, $\text{pos\_est}_i$ is the average position estimate for the snapshot, $\text{pos\_est\_12}_i$ is the position estimate determined based on signals received from a first transmitter and a second transmitter for the $i^{th}$ snapshot, $\text{pos\_est\_23}_i$ is the position estimate determined based on signals received from the second transmitter and a third transmitter for the $i^{th}$ snapshot, and $\text{pos\_est\_13}_i$ is the position estimate determined based on signals received from the first transmitter and the third transmitter for the snapshot.

In an embodiment, the error associated with the calculated position estimate may be expressed as:

$$\text{pos}_{error}(i, j) = \qquad \text{Equation 29}$$
$$\sqrt{(Rx_n(\text{true}) - Rx_n(\text{sim}))^2 + (Rx_e(\text{true}) - Rx_e(\text{sim}))^2}.$$

In equation 29, $\text{pos}_{error}(i,j)$ is the position error (m), $Rx_n$(true) is the true receiver position in northing, $Rx_e$(true) is the true receiver position in easting, $Rx_n$(sim) is the simulated (or estimated) receiver position in northing, and $Rx_e$(sim) is the simulated (or estimated) receiver position in easting.

As explained above, in a second embodiment utilizing averaging techniques, AoAs may be determined for a plurality of snapshots, and then the AoAs for each snapshot are then averaged to determine the final AoA that is then used to determine the position estimate. This averaging technique may be expressed as:

$$AoA_n = \sum_{i=1}^{N} \frac{AoA_i}{N}. \qquad \text{Equation 30}$$

In equation 30, $AoA_n$ is the AoA for the signal transmitted from transmitter n, $AoA_i$ is the AoA from the $i^{th}$ transmission located at tower n, and N is the total number of transmit stations at tower n.

As explained above, in a third embodiment utilizing averaging techniques, phase differences ($\Delta\varphi$) may be determined for a plurality of snapshots, and then the phase differences for each snapshot are then averaged to determine the final phase differences that is then used to determine the position estimate. This averaging technique may be expressed as:

$$\Delta\phi_n = \sum_{i=1}^{N} \frac{\Delta\phi_i}{N}. \qquad \text{Equation 30}$$

In equation 31, $\Delta\varphi$ is the phase difference for the signal transmitted from transmitter n, $\Delta\varphi_i$ is the phase difference from the $i^{th}$ transmission located at tower n, and N is the total number of transmit stations at tower n.

From the above, it has been shown that the system 1100 of FIG. 11 and the system 1000 of FIG. 10 enable the UAV 1400 to determine its position with greater accuracy by using signals transmitted from one or more supertowers. It is to be appreciated that the systems 1000 and 1100 provide improved navigation techniques for UAVS and may enable UAV deployments in a diverse number of environments (e.g., outdoors, inside office buildings, warehouses, arenas, hospitals, hangars, homes, caves, mines, bunkers, tunnels, etc.), many of which are not suitable for GPS navigation techniques. For many commercial and industrial applications and environments, the navigation techniques provided by the systems 1000 and 1100 may be readily deployed without requiring purpose-built infrastructure, thereby reducing the cost to deploy the systems and enabling commercial and industrial entities to adopt UAVs for desired applications more quickly. Additionally, the systems 1000 and 1100 provide a decentralized solution to UAV navigation whereby operation of the UAV 1400 is not dependent on any central site or node. Thus, the systems 1000 and 1100 provide an improvement in the field of UAV navigation and improve the navigation and operation of the UAV 1400 itself.

Figure 13:
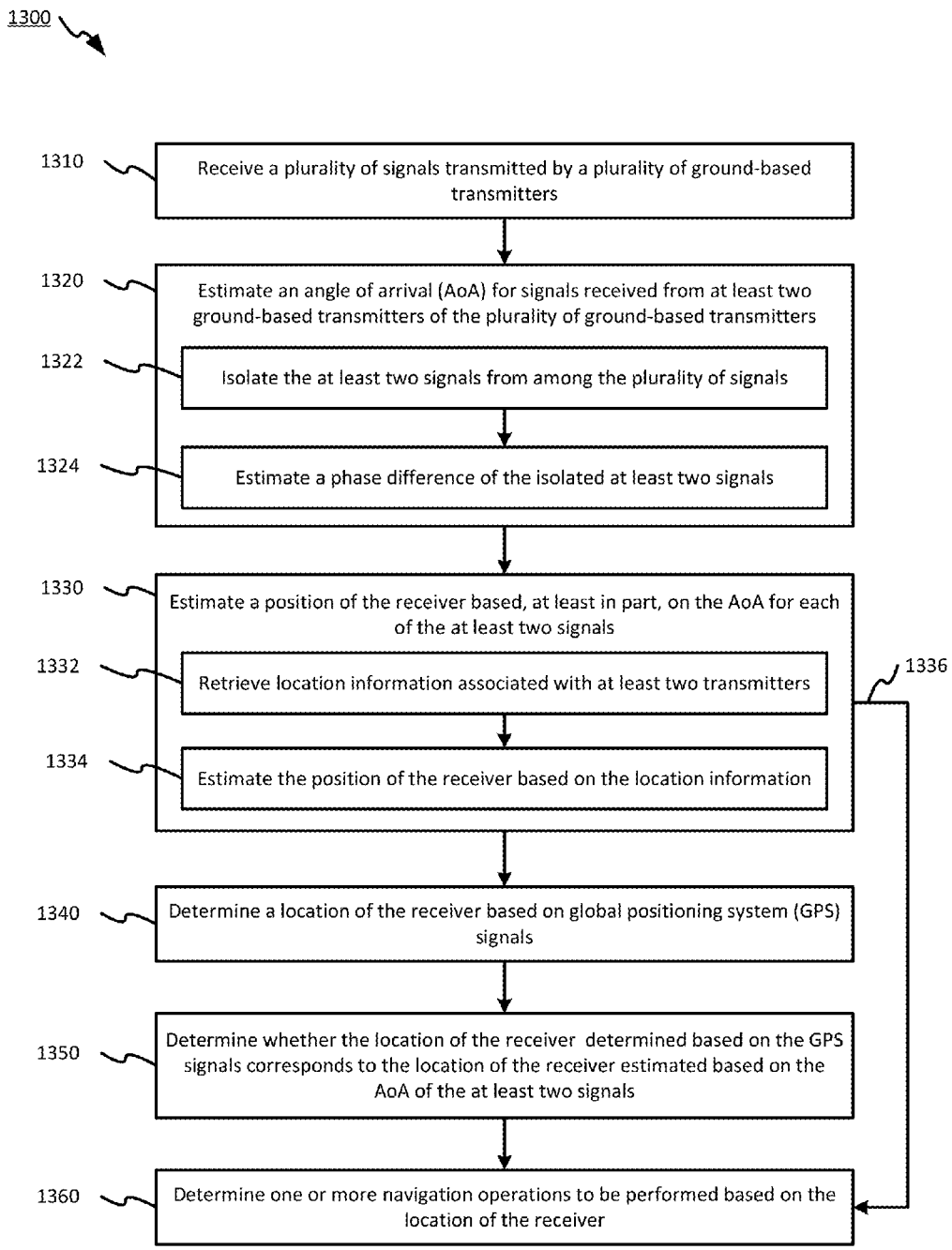
FIG. 13 is a flow diagram illustrating an embodiment of a method for navigating an unmanned aerial vehicle (UAV) using signals received from a plurality of ground-based transmitters (G-B TXs) that may include at least one supertower.

Referring to FIG. 13, a flow diagram illustrating an embodiment of a method for navigating an unmanned aerial vehicle (UAV) using signals received from a plurality of ground-based transmitters (G-B TXs) that may include at least one supertower is shown as a method 1300. In an embodiment, the method 1300 may be performed by the UAV 1400 of FIGS. 10 and 11. In an embodiment, the method 1300 may be stored as instructions at a memory of a UAV. The instructions, when executed by a processor of the UAV, may cause the UAV to perform operations for navigating the UAV from a point of origin to a destination based at least in part on the signals received from the plurality of G-B TXs.

At 1310, the method 1300 includes receiving a plurality of signals transmitted by a plurality of ground-based transmitters at a receiver. In an embodiment, the receiver may be the receiver 146 of FIGS. 1 and 3. The plurality of ground-based transmitters may include at least one supertower configured to transmit two or more signals of the plurality of signals. In an embodiment, the at least one supertower may include one or more of the supertowers 1140, 1160, 1180 of FIG. 10 and/or one or more of the supertowers 1120, 1130, 1140 of FIG. 11.

At 1320, the method 1300 includes estimating an angle of arrival (AoA) for signals received from at least two ground-based transmitters of the plurality of ground-based transmitters. In an embodiment, estimating the AoA for the signals may include, at 1322, isolating the at least two signals from among the plurality of signals prior to determining the AoA, and, at 1324, estimating a phase difference of the at least two isolated signals. In an embodiment, the AoA for each of the signals may be determined based on the phase differences. In an embodiment, the method 1300 may include capturing a plurality of snapshots for each of the received signals. The plurality of snapshots captured for each of the received signals may be used to determine the AoA, the phase difference, or a combination thereof, for each of the received signals. For example, in an embodiment, the method 1300 may determining a phase difference for each snapshot of the plurality of snapshots, and averaging the phase differences for each snapshot to determine a final phase difference for each of the received signals, where the AoAs for each of the received signals is estimated based on the average phase difference for the respective signals, as described above with reference to FIGS. 10-12C. When the plurality of signals received at the receiver includes signals transmitted by the at least one supertower, the final phase difference for the signals transmitted by the at least one supertower may correspond to an average of the phase differences for all of the signals transmitted by the at least one supertower, as described above with reference to FIGS. 10-12C. In an additional or alternative embodiment, the method 1300 may include determining an AoA for each snapshot of the plurality of snapshots, and then averaging the AoA for each snapshot to determine a final AoA for each of the received signals, as described above with reference to FIGS. 10-12C. When the plurality of signals received at the receiver includes signals transmitted by the at least one supertower, the final AoA for the signals transmitted by the at least one supertower may correspond to an average of the AoAs for all of the signals transmitted by the at least one supertower, as described above with reference to FIGS. 10-12C.

At 1330, the method 1300 may include estimating a position of the receiver based, at least in part, on the AoA for each of the at least two signals. In an embodiment, the method 1300 may include, at 1332, retrieving location information associated with the at least two transmitters, and, at 1334, estimating the position of the receiver based on the location information. In an embodiment, estimating the position of the receiver based on the location information may be performed as described above with respect to FIGS. 1-9K (e.g., based on the AoAs for each of the received signals and location information for each of the at least two transmitters). In an additional or alternative embodiment, the method 1300 may include estimating the position of the receiver based on the average AoAs, as described above with respect to FIGS. 11-12C. In an additional or alternative embodiment, the method 1300 may include determining AoAs for each of the signals based on the average phase differences, and then determining the position of the receiver based on the position estimates using the AoAs calculated using the average phase differences, as described above with respect to FIGS. 11-12C. In an embodiment, the method 1300 may include determining a position estimate for each snapshot of the plurality of snapshots using the AoAs, and averaging the position estimates to estimate the position of the receiver.

As indicated by the arrow 1336, in an embodiment, the method 1300 may include, at 1360 determine one or more navigation operation for navigating the UAV based on the position of the receiver estimated at 1330. The one or more navigation operations may be provided to a propulsion and control system configured to execute the one or more navigation operations for navigating the UAV from a point of origin to a destination.

In an additional or alternative embodiment, the method 1300 may include, at 1340, determining a location of the receiver based on global positioning system (GPS) signals, and, at 1350, determining whether the location of the receiver determined based on the GPS signals corresponds to the location of the receiver estimated based on the AoA of the at least two signals. In an embodiment, the navigation operation for navigating the UAV based on the position of the receiver as estimated based on the AoAs may be determined based on whether the location of the receiver as determined based on the GPS signals corresponds to the location of the receiver as estimated based on the AoA of the at least two signals. For example, if the location of the receiver as determined based on the GPS signals corresponds to (e.g., is within a threshold tolerance of) the location of the receiver as estimated based on the AoA of the at least two signals, the UAV may determine that the GPS signals are accurate (e.g., not being spoofed or otherwise manipulated), and may continue to navigate using the GPS signals. However, if the location of the receiver as determined based on the GPS signals does not correspond to (e.g., is not within a threshold tolerance of) the location of the receiver as estimated based on the AoA of the at least two signals, the UAV may determine that the GPS signals are inaccurate (e.g., being spoofed or otherwise manipulated), and may begin navigating using position estimates determined based on the signals received from the plurality of G-B TXs.

The method 1300 provides an improved navigation technique for UAVs that may enable UAV deployments in a diverse number of environments (e.g., outdoors, inside office buildings, warehouses, arenas, hospitals, hangars, homes, caves, mines, bunkers, tunnels, etc.), many of which are not suitable for GPS navigation techniques. For many commercial and industrial applications and environments, the navigation techniques provided by the method 1300 may be readily deployed without requiring purpose-built infrastructure, thereby reducing the cost to deploy UAVs operable to perform the method 1300. This may enable commercial and industrial entities to adopt UAVs for desired applications more quickly. Additionally, the method 1300 provides a decentralized solution to UAV navigation whereby operation of the UAV is not dependent on any central site or node. Further, as explained above, the method 1300 provides a technique for navigating the UAV even if GPS signals are unavailable or are otherwise being manipulated. Further, the method 1300 provides improved accuracy with respect to position estimates determined from the signals of the plurality of G-B TXs by leveraging signals received from at least one supertower. Thus, the method 1300 provides an improvement in the field of UAV navigation and improves the navigation and operation of the UAV itself. It is noted that although FIGS. 10-13 describe embodiments for UAVs configured to leverage signals received from one or more supertowers during navigation, UAVs configured according to the embodiments illustrated in FIGS. 10-13 are also capable of navigating without leveraging signals received from a supertower, such as when no supertower(s) is available, or when signals from a supertower are not suitable for navigation purposes (e.g., due to low SNR, etc.). In such instances, the UAV may navigate using signals of opportunity received from other G-B TXs (e.g., non-supertowers), as described with reference to FIGS. 1-9K.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for navigating a vehicle, the method comprising:
   detecting, during navigation of a vehicle from a point of origin to a destination, a plurality of signals at two or more receiver elements of a receiver, wherein the receiver is integrated with the vehicle;
   estimating, by a processor of the vehicle during the navigation, an angle of arrival (AoA) for at least two signals of the plurality of signals;
   estimating, by the processor during the navigation, a current position of the vehicle based, at least in part, on the AoA for each of the at least two signals;
   determining, by the processor during the navigation, at least one navigation maneuver for navigating the vehicle from the point of origin to the destination based on the estimated position of the vehicle, wherein the at least one navigation maneuver comprises a steering operation to change a direction of travel of the vehicle, a speed control operation to modify a speed of the vehicle, or a combination thereof; and
   executing, by a propulsion and control system of the vehicle, the at least one navigation maneuver.

2. The method of claim 1, wherein the plurality of signals include a plurality of frequency modulation (FM) radio signals, and wherein each of the plurality of FM radio signals is broadcast from one of a plurality of different FM radio transmitters.

3. The method of claim 1, wherein the method includes:
   isolating the at least two signals from among the plurality of signals prior to determining the AoA; and estimating a phase difference of the at least two isolated signals.

4. The method of claim 1, wherein the method includes:
retrieving, from a database stored at a memory of the vehicle, location information associated with at least two transmitters, wherein each of the at least two transmitters transmits a signal of the at least two signals; and
estimating the current position of the vehicle based on the location information and the AoA for each of the at least two signals.

5. The method of claim 1, wherein the current position of the vehicle estimated based on the AoA of the at least two signals is a first location, and wherein the method includes:
determining a global positioning system (GPS) location of the receiver based on GPS signals; and
determining whether the first location corresponds to the GPS location.

6. The method of claim 5, wherein determining whether the first location corresponds to the GPS location includes:
determining a distance between the first location and the GPS location;
determining whether the distance between the first location and the GPS location satisfies a threshold distance; and
modifying a navigation mode of the vehicle from a first navigation mode to a second navigation mode when the distance between the first location and the GPS location does not satisfy the threshold distance, wherein the first navigation mode comprises a GPS assisted navigation mode and the second navigation mode comprises a navigation mode that utilizes position estimates derived from AoAs of received signals for navigation of the vehicle.

7. The method of claim 6, wherein modifying the navigation mode includes initiating operations to navigate the vehicle using only future position estimates of the vehicle determined based on the AoA of the at least two signals.

8. The method of claim 1, wherein the method includes localizing the position of the vehicle using at least one additional signal of the plurality of signals that is different from the at least two signals.

9. The method of claim 1, wherein two or more receiver elements include two or more receive antennas, two or more transducers, or a combination thereof.

10. The method of claim 1, wherein the method further comprises:
determining, by the processor of the vehicle, a number of different frequencies associated with the plurality of signals, each different frequency of the number of different frequencies corresponding to one of the plurality of signals; and
determining whether the number of different frequencies satisfies a threshold number of frequencies, the threshold number of frequencies configured to provide a threshold level of accuracy for estimating the position of the vehicle based on estimates of the AoA for each of the at least two signals,
wherein the at least one navigation maneuver comprises one or more first navigation maneuvers when the number of different frequencies satisfies the threshold number of frequencies, and
wherein the at least one navigation maneuver comprises one or more second navigation maneuvers that are different from the one or more first navigation maneuvers when the number of different frequencies does not satisfy the threshold number of frequencies.

11. The method of claim 1, wherein the method further comprises determining whether the AoA for the at least two signals satisfies range of AoA values configured to provide accurate position estimates for the vehicle, wherein the position of the vehicle is estimated based on AoA estimates that satisfy the range of AoA values.

12. A non-transitory computer-readable storage medium storing instructions that, when executed by a processor, cause the processor to perform operations for navigating a vehicle, the operations comprising:
detecting, during navigation of the vehicle from a point of origin to a destination, a plurality of signals at two or more receiver elements of a receiver, wherein the receiver is integrated with the vehicle;
estimating an angle of arrival (AoA) for at least two signals of the plurality of signals; and
estimating a current position of the vehicle based, at least in part, on the AoA for each of the at least two signals;
determining at least one navigation maneuver for navigating the vehicle from the point of origin to the destination based on the estimated position of the vehicle, wherein the at least one navigation maneuver comprises a steering operation to change a direction of travel of the vehicle, a speed control operation to modify a speed of the vehicle, or a combination thereof; and
controlling a propulsion and control system of the vehicle to execute the at least one navigation maneuver.

13. The non-transitory computer-readable storage medium of claim 12, wherein the plurality of signals include a plurality of frequency modulation (FM) radio signals, and wherein each of the plurality of FM radio signals is broadcast from one of a plurality of different FM radio transmitters.

14. The non-transitory computer-readable storage medium of claim 12, wherein the operations include:
isolating the at least two signals from among the plurality of signals prior to determining the AoA; and
estimating a phase difference of the at least two isolated signals.

15. The non-transitory computer-readable storage medium of claim 12, wherein the operations include:
retrieving, from a database stored at a memory of the vehicle, location information associated with at least two transmitters, wherein each of the at least two transmitters transmits a signal of the at least two signals; and
estimating the position of the vehicle based on the location information.

16. The non-transitory computer-readable storage medium of claim 12, wherein the position of the vehicle estimated based on the AoA of the at least two signals is a first location, and wherein the operations include:
determining a global positioning system (GPS) location of the receiver based on GPS signals; and
determining whether the first location corresponds to the GPS location.

17. The non-transitory computer-readable storage medium of claim 16, wherein the operations for determining whether the first location corresponds to the GPS location further include:
determining a distance between the first location and the GPS location;
determining whether the distance between the first location and the GPS location satisfies a threshold distance; and modifying a navigation mode of the vehicle from a first navigation mode to a second navigation mode when the distance between the first location and the GPS location does not satisfy the threshold distance, wherein the first navigation mode comprises a GPS assisted navigation mode and the second navigation mode comprises a navigation mode that utilizes position estimates derived from AoAs of received signals for navigation of the vehicle.

18. The non-transitory computer-readable storage medium of claim 17, wherein the operations for modifying the navigation mode of the vehicle include operations for initiating operations to navigate the vehicle using only future position estimates of the vehicle determined based on the AoA of the at least two signals.

19. The non-transitory computer-readable storage medium of claim 12, wherein the operations include determining a differential angle of arrival (dAoA) with respect to two of the at least two signals, wherein the dAoA is configured to remove a reference to an orientation of a geometry of the two or more receiver elements, and wherein the current position of the vehicle is estimated, based at least in part on the dAoA.

20. The non-transitory computer-readable storage medium of claim 12, wherein the operations include localizing the position of the vehicle using at least one additional signal of the plurality of signals that is different from the at least two signals.

21. The non-transitory computer-readable storage medium of claim 12, wherein two or more receiver elements include two or more receive antennas, two or more transducers, or a combination thereof.

22. An unmanned aerial vehicle (UAV) comprising:
   a receiver configured to receive a plurality of signals transmitted by a plurality of ground-based transmitters, wherein the plurality of ground-based transmitters includes at least one supertower, and wherein the at least one supertower is configured to transmit two or more signals of the plurality of signals;
   a propulsion and control system configured to execute navigation operations for navigating the UAV from a point of origin to a destination; and
   a processor configured to:
      estimate an angle of arrival (AoA) for signals received from at least two ground-based transmitters of the plurality of ground-based transmitters; and
      estimate a current position of the UAV based, at least in part, on the AoA for each of the at least two signals;
      determine at least one navigation maneuver for navigating the vehicle from the point of origin to the destination based on the estimated position of the UAV, wherein the at least one navigation maneuver comprises a steering operation to change a direction of travel of the vehicle, a speed control operation to modify a speed of the vehicle, or a combination thereof; and
      control execution of the at least one navigation maneuver by the propulsion and control system.

23. The UAV of claim 22, wherein the plurality of signals include a plurality of frequency modulation (FM) radio signals, and wherein each of the plurality of FM radio signals is broadcast from one of the plurality of ground-based transmitters.

24. The UAV of claim 22, wherein the at least one processor is configured to:
   isolate the at least two signals from among the plurality of signals prior to determining the AoA; and
   estimate a phase difference of the at least two isolated signals, wherein the AoA for each of the signals is determined based on the phase difference.

25. The UAV of claim 22, wherein the at least one processor is configured to:
   capture a plurality of snapshots for each of the received signals;
   determine a position estimate for the UAV based on each snapshot of the plurality of snapshots using the AoAs; and
   average the position estimates to estimate the position of the UAV.

26. The UAV of claim 22, wherein the at least one processor is configured to:
   capture a plurality of snapshots for each of the received signals;
   determine a phase difference for each snapshot of the plurality of snapshots; and
   average the phase differences for each snapshot to determine a final phase difference, wherein the AoAs for each of the signals are estimated based on the final phase difference for each of the plurality of snapshots.

27. The UAV of claim 26, wherein, when the plurality of signals received at the receiver includes signals transmitted by the at least one supertower, the final phase difference for the signals transmitted by the at least one supertower corresponds to an average of the phase differences for all of the signals transmitted by the at least one supertower.

28. The UAV of claim 22, wherein the at least one processor is configured to:
   capture a plurality of snapshots for each of the received signals;
   determine an AoA for each snapshot of the plurality of snapshots; and
   average the AoA for each snapshot to determine a final AoA, wherein the position of the UAV is estimated based on the average AoAs.

29. The UAV of claim 28, wherein, when the plurality of signals received at the receiver includes signals transmitted by the at least one supertower, the final AoA for the signals transmitted by the at least one supertower corresponds to an average of the AoAs for all of the signals transmitted by the at least one supertower.

30. The UAV of claim 22, wherein the position of the UAV estimated based on the AoA of the at least two signals is a first location, and wherein the at least one processor is configured to:
   determine a global positioning system (GPS) location of the UAV based on GPS signals;
   determine a distance between the first location and the GPS location;
   determine whether the distance between the first location and the GPS location satisfies a threshold distance; and
   modify a navigation mode of the UAV from a first navigation mode to a second navigation mode when the distance between the first location and the GPS location does not satisfy the threshold distance, wherein the first navigation mode comprises a GPS assisted navigation mode and the second navigation mode comprises a navigation mode that utilizes position estimates derived from AoAs of received signals for navigation of the vehicle.

* * * * *

UNITED STATES PATENT AND TRADEMARK OFFICE
CERTIFICATE OF CORRECTION

PATENT NO. : 9,945,931 B2
APPLICATION NO. : 14/966870
DATED : April 17, 2018
INVENTOR(S) : Christopher T. Allen et al.

It is certified that error appears in the above-identified patent and that said Letters Patent is hereby corrected as shown below:

In the Specification

At Column 19, Line number 39, delete "$(x_1, y_1)$" and replace with --$(x_t, y_t)$--.
At Column 19, Line number 47, delete "$(x_1, y_1)$" and replace with --$(x_t, y_t)$--.
At Column 24, Line number 6, delete "(a)" and replace with --($\sigma$)--.
At Column 24, Line number 8, delete "that were outside a were discarded" and replace with --that were outside $\sigma$ were discarded--.
At Column 24, Line number 11, delete "estimates for before and after" and replace with --estimates for $\varepsilon_{\mu\_\Delta\phi}$ before and after--.
At Column 26, Line number 50, delete "the snapshot" and replace with --the $i^{th}$ snapshot--.
At Column 26, Line number 57, delete "the snapshot" and replace with --the $i^{th}$ snapshot--.
At Column 27, Line number 33, delete "$\Delta\phi$" and replace with --$\Delta\phi_n$--.
At Column 27, Line number 34, delete "$\Delta\varphi_i$" and replace with --$\Delta\phi_i$--.

In the Claims

At Column 32, Claim number 11, Line number 3, delete "satisfies range" and replace with --satisfies a range--.

Signed and Sealed this
Fifth Day of June, 2018

Andrei Iancu
*Director of the United States Patent and Trademark Office*